US012607361B2

(12) United States Patent
Shin et al.

(10) Patent No.: US 12,607,361 B2
(45) Date of Patent: Apr. 21, 2026

(54) APPLIANCE

(71) Applicant: LG ELECTRONICS INC., Seoul (KR)

(72) Inventors: Myeongsu Shin, Seoul (KR); Wanglim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 347 days.

(21) Appl. No.: 18/229,313

(22) Filed: Aug. 2, 2023

(65) Prior Publication Data

US 2024/0044679 A1　Feb. 8, 2024

(30) Foreign Application Priority Data

Aug. 2, 2022　(KR) ......................... 10-2022-0095984

(51) Int. Cl.
| | |
|---|---|
| *F24C 7/08* | (2006.01) |
| *F24C 15/00* | (2006.01) |
| *F24C 15/02* | (2006.01) |
| *D06F 34/20* | (2020.01) |
| *G01D 11/24* | (2006.01) |

(52) U.S. Cl.
CPC ........... *F24C 7/085* (2013.01); *F24C 15/006* (2013.01); *F24C 15/02* (2013.01); *D06F 34/20* (2020.02); *F25D 2700/02* (2013.01); *G01D 11/245* (2013.01)

(58) Field of Classification Search
CPC ........ F24C 7/085; F24C 15/006; F24C 15/02; F24C 15/023; D06F 34/20; F25D 2700/02; F25D 29/005; G01D 11/245; G01P 15/097

USPC ........................................................ 126/21 A
See application file for complete search history.

(56) References Cited

U.S. PATENT DOCUMENTS

| | | |
|---|---|---|
| 8,726,791 B2 | 5/2014 | Adamczak et al. |
| 2010/0206414 A1 | 8/2010 | Adamczak et al. |
| 2016/0320067 A1 | 11/2016 | Dachs et al. |
| 2018/0058702 A1* | 3/2018 | Jang ........................ F24C 7/081 |
| 2020/0363070 A1* | 11/2020 | Combs, Jr. ............ F24C 15/023 |

FOREIGN PATENT DOCUMENTS

| | | | |
|---|---|---|---|
| CN | 212764423 U | * 3/2021 | |
| CN | 214484217 | 10/2021 | |
| CN | 214484217 U | * 10/2021 | |
| DE | 202014006991 U1 | * 12/2014 | .............. F24C 7/085 |
| JP | 2018-094416 | 6/2018 | |
| KR | 10-2015-0030016 | 3/2015 | |
| KR | 10-2019-0001876 | 1/2019 | |

(Continued)

OTHER PUBLICATIONS

Extended European Search Report dated Jan. 3, 2024, issued in Application No. 23189127.6.

*Primary Examiner* — Allen R. B. Schult
*Assistant Examiner* — William C Weinert
(74) *Attorney, Agent, or Firm* — KED & ASSOCIATES, LLP

(57) ABSTRACT

Disclosed herein is an appliance. The appliance includes a hinge configured to rotatably support a door is connected to the door and a main body so that a vibration generated at the door is able to be transmitted to the main body through the hinge, and a sensor installed at the main body detects the vibration transmitted to the main body through the hinge.

16 Claims, 13 Drawing Sheets

(56)    References Cited

FOREIGN PATENT DOCUMENTS

| WO | WO 2015/086247 | 6/2015 |
| WO | WO 2021/125428 | 6/2021 |
| WO | WO 2021/125430 | 6/2021 |

* cited by examiner

APPLIANCE

CROSS-REFERENCE TO RELATED APPLICATION(S)

This application claims priority to and the benefit of Korean Patent Application No. 10-2022-0095984, filed in Korea on Aug. 2, 2022, the disclosure of which is incorporated herein by reference in its entirety.

BACKGROUND

1. Field

The present disclosure relates to an appliance, and more particularly, to an appliance having a see-through window provided in a door to allow an inside of the appliance to be viewed from the outside.

2. Background

Appliances that accommodate an object in an inner space and include a door, such as a refrigerator and a clothes treating apparatus, are widely used. Such appliances may include an accommodation space for accommodating an object inside a cabinet forming an exterior and a door for opening and closing the accommodation space. Two or more doors may be included in such appliances as necessary.

Generally, a door of an appliance is manufactured to be opaque. Therefore, it is difficult to check an object accommodated inside an accommodation space while the accommodation space is closed by the door. In an appliance including such a door, opening the door is essential for checking an object accommodated inside an accommodation space. However, in the case of appliances such as a refrigerator, an oven, and a dryer, cold air or hot air inside the appliance leaks to the outside when the door is opened, which may cause unnecessary energy loss.

Also, in the case of an appliance such as a washing machine, wash water may pour out when the door is opened. Accordingly, the door of a washing machine currently performing a washing operation is maintained in a locked state to prevent the door from being opened during the washing operation.

Meanwhile, in some cases, a see-through window is mounted on a door of some appliances such as an oven, a washing machine, and a dryer. Because a see-through window is mounted on a door in this way, a state of an object inside the appliance can be checked through the see-through window. However, even when a see-through window is mounted on a door of an appliance as described above, it is difficult to properly check an object therein at night or when it is dark around the appliance.

Accordingly, in recent years, appliances that include a lighting device for illuminating the inside where an object is accommodated, as well as a door having a see-through window mounted thereon, have been widely released. Such appliances usually include an operation switch for turning the lighting device on or off. A user may operate the operation switch and turn on the lighting device to more clearly check a state of an object, illuminated by the lighting device, through the see-through window.

However, when the operation switch for turning the lighting device on or off is separately provided in the appliance, the number of operation switches included in the appliance may increase correspondingly. In this case, the overall aesthetic sense of the appliance may be degraded due to an excessive number of operation switches being disposed in the appliance.

Also, when an excessive number of operation switches are disposed in an appliance, the size of each operation switch is inevitably decreased, or the operation switches are inevitably disposed at close intervals. This may increase the possibility of an occurrence of erroneous operation of the operation switches and may reduce convenience of operation by a user. Also, an excessive number of operation switches may make it difficult for a user to remember which operation switch to operate in each situation, and this may make it difficult for the user to properly use the appliance.

Further, when it is dark around the appliance, there may be difficulty in locating and operating the operation switch for turning the lighting device on or off. That is, a problem occurs in that the lighting device, which is more necessary when it is dark around the appliance, becomes difficult to use due to the darkness around the appliance.

In recent years, an appliance having a function allowing a lighting device, configured to illuminate the inside of the appliance, to be operated in response to a user simply lightly knocking on the door has been released. Such an appliance allows the lighting device to be operated and illuminate the inside of the appliance in response to a user simply knocking on the door without opening the door or operating an operation switch, and thus the above-described problems can be addressed to some extent.

In the home appliance having the function allowing the lighting device, configured to illuminate the inside of the appliance, to be operated in response to a user simply knocking on the door (hereinafter referred to as "knock-on function"), a lamp is operated when an acoustic wave generated due to a knock input applied to the door is detected by a sensor. However, in such an appliance, there is a problem in that an installation position of the sensor is very limited.

That is, in the appliance, for an acoustic wave generated due to a knock to reach the sensor, a portion between a point where the knock is made and a point where the sensor is installed should be formed of a single medium. This is because, for the acoustic wave generated due to the knock to reach the sensor, the identity and continuity of a medium for transmitting the acoustic wave need to be maintained.

However, the number of positions that satisfy the condition that the point where the knock is made and the point where the sensor is installed are connected by a single medium is inevitably very limited within the appliance. Accordingly, the appliance inevitably has the problem in that the installation position of the sensor is very limited.

Also, in the case of an appliance such as an oven, due to the characteristic of the oven that the inside of a cooking chamber closed by a door is heated, high-temperature heat is inevitably transferred to the door and portions around the door. When a sensor is installed at the door and the portions around the door to which high-temperature heat is transferred as described above, a problem may occur in that the sensor malfunctions or is damaged due to an influence of the heat.

In an appliance having the knock-on function, maintaining the identity of a medium between the position at which a knock is made and the position at which an acoustic wave sensor is installed is very important. In the appliance, in addition to a vibration caused by the knock, various other vibrations such as a vibration of the appliance itself or a vibration caused by another external force may be generated.

A situation in which the other vibrations and the vibration caused by the knock are not distinguished, leading to an erroneous detection of the knock, may occur, and in order to address this, the conventional appliance having the knock-on function adopts a method in which the identity of a medium is maintained between the position at which the knock is made and the position at which an acoustic wave sensor is installed. To this end, the acoustic wave sensor for recognizing a knock input is installed on a front panel of the appliance.

When the identity of a medium is not maintained, an attenuation range of acoustic waves transmitted along heterogeneous media is relatively very large compared to when the identity of a medium is maintained. Therefore, it is sufficient to attenuate the intensity of acoustic waves generated due to impact applied to portions of the appliance other than the front panel thereof. According to the appliance, using such an attenuation range of acoustic waves, acoustic waves due to a knock made on the front panel and acoustic waves due to the vibration of the appliance itself or the vibration caused by another external force can be distinguished.

In the appliance, by the above-described method, a knock input is detected and a vibration not generated at the front panel is not recognized as a knock, and thus malfunction due to a vibration of a refrigerator itself or a vibration caused by another external force can be effectively reduced. However, in the appliance, because it is necessary to attach the acoustic wave sensor on the front panel, there is a problem that an installation position of the sensor is limited. Also, in the appliance, the acoustic wave sensor is used to distinguish a knock signal generated at the front panel from vibrations caused by other reasons, but the use of the acoustic wave sensor may cause the following problems. That is, because whether a knock has been input is recognized only in consideration of the intensity and pattern of acoustic waves by the acoustic wave sensor, it is highly likely that the acoustic wave sensor may mistakenly recognize even acoustic waves due to factors other than a knock as acoustic waves due to a knock.

Since the detection of acoustic waves is performed without considering a direction relative to the position at which acoustic waves are generated, the acoustic wave sensor is not able to determine the position at which acoustic waves have been generated. Therefore, when acoustic waves generated due to a knock made on the door and acoustic waves generated due to other reasons at a position other than the door have similar intensities and patterns, it may be difficult for the acoustic wave sensor to properly distinguish between the two acoustic waves. That is, when the intensity and pattern of acoustic waves generated due to other reasons at a position other than the door are similar to those of acoustic waves generated due to a knock, it is highly likely that the acoustic wave sensor may mistakenly detect the acoustic waves due to other reasons as the acoustic waves due to a knock.

Also, in the case of an appliance in which a high-temperature state is maintained at a door and around the door, such as an oven, because a risk that a sensor may malfunction or be damaged due to hot air transferred to a see-through window is high, it is difficult to install the sensor at the see-through window. However, when the sensor is installed at a position other than the see-through window, a distance between a knock input point and the sensor is increased correspondingly, and a problem of degradation of knock detection performance occurs.

Also, in the appliance, an acoustic wave sensor is installed by being pressed toward the door, and the sensitivity of an acoustic wave sensor varies according to an extent to which the acoustic wave sensor is pressed toward the door. For example, the stronger the acoustic wave sensor is pressed toward the door, the lower the sensitivity of the acoustic wave sensor, and the weaker the acoustic wave sensor is pressed toward the door, the higher the sensitivity of the acoustic wave sensor. When the sensitivity of the acoustic wave sensor is low, the knock detection performance is correspondingly low, and when the sensitivity of the acoustic wave sensor is too high, the acoustic wave sensor reacts to even low-intensity acoustic waves around the door, such as a vibration sound of a motor, causing an increase in the possibility of an occurrence of erroneous detection.

As described above, conventionally, due to a difficulty of filtering vibration due to noise, an acoustic wave sensor is adopted, in place of a vibration sensor, for knock detection of an appliance. Also, conventionally, when it is difficult to attach the sensor on the door due to high-temperature heat in appliances such as an oven, the sensor is inevitably installed at a position other than the door. However, when a distance between a knock input point and the acoustic wave sensor is increased as above, there are problems that it becomes difficult to accurately detect a knock input due to an increase in attenuation of transmitted acoustic waves, and it becomes difficult to filter a noise signal.

Meanwhile, in appliances being released nowadays, cutting-edge functions for convenience in use are being continuously added, and accordingly, operation devices for operating numerous additional functions are being added to doors. Accordingly, the design and manufacture of doors are gradually becoming more complicated, and thus it is a recent trend to arrange devices or elements for newly-added functions at portions other than a door.

In particular, because the sizes of a see-through window and a display that are mounted on a door continue to increase, it is becoming difficult to arrange a free space for additionally placing devices, such as sensors, elements, and modules, for cutting-edge functions on the door. Accordingly, the need to attach the corresponding devices at positions other than the door is arising, and the same is true for devices such as a sensor for detecting a knock input.

Meanwhile, in built-in type appliances that are built into the living room or kitchen, particularly, in built-in type ovens that are built into the kitchen, a cabinet for forming an exterior of the appliance is omitted in many cases. Such built-in type ovens are generally installed by being fitted between a piece of kitchen furniture and a wall surface or between a piece of kitchen furniture and another piece of kitchen furniture.

Therefore, it is difficult to secure a space for installing a sensor assembly even between a side surface of the appliance and a piece of kitchen furniture or a wall surface. Considering that there are not many places where the sensor assembly can be installed other than the side surface or door of the appliance, it is, in fact, not easy to secure an installation space for the sensor assembly on the appliance. That is, there is a difficulty that the sensor assembly should be arranged to meet various strict conditions to improve knock detection performance in the situation in which it is difficult to secure an installation space for the sensor assembly on the appliance.

BRIEF DESCRIPTION OF THE DRAWINGS

The embodiments will be described in detail with reference to the following drawings in which like reference numerals refer to like elements wherein:

FIG. 2 is a perspective view showing an open state of a cooking chamber of the appliance illustrated in FIG. 1;

FIG. 11 is a cross-sectional view along line "XI-XI" of FIG. 10;

DETAILED DESCRIPTION

Figure 1:
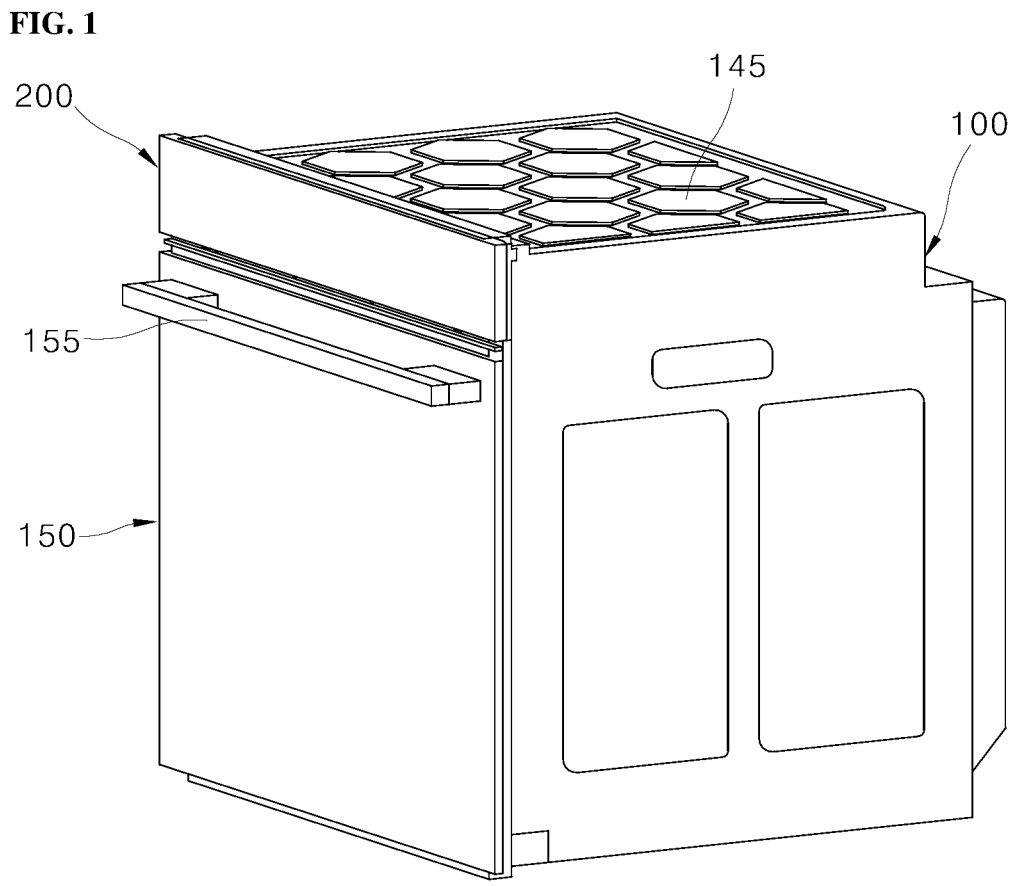
FIG. 1 is a perspective view illustrating an appliance according to one embodiment of the present disclosure.

The objectives, features, and advantages will be described in detail below with reference to the accompanying drawings, and accordingly, those of ordinary skill in the art to which the present disclosure pertains should be able to easily practice the technical idea of the present disclosure. In describing the present disclosure, when it is determined that detailed description of a known art related to the present disclosure may unnecessarily obscure the gist of the present disclosure, the detailed description thereof will be omitted. Hereinafter, exemplary embodiments according to the present disclosure will be described in detail with reference to the accompanying drawings. In the drawings, the same reference numerals are used to indicate the same or similar components.

Although terms such as first and second are used to describe various components, of course, the components are not limited by the terms. The terms are only used to distinguish one component from another component, and of course, a first component may also be a second component unless otherwise stated.

The present disclosure is not limited to the embodiments disclosed below and may be changed in various ways and implemented in various different forms. The present embodiments make the disclosure of the present disclosure complete and are provided to completely inform those of ordinary skill in the art of the scope of the disclosure. Therefore, the present disclosure should be understood as, instead of being limited to the embodiments disclosed below, including all changes, equivalents, or substitutes included in the technical idea and scope of the present disclosure as well as any substitution or addition made between a configuration of any one embodiment and a configuration of another embodiment.

The accompanying drawings are only provided to facilitate understanding of the embodiments disclosed herein, and the technical idea disclosed herein is not limited by the accompanying drawings and should be understood as including all changes, equivalents, or substitutes included in the idea and technical scope of the present disclosure. In the drawings, sizes or thicknesses of components may be exaggerated or reduced in consideration of convenience of understanding, etc., but the protection scope of the present disclosure should not be construed as being limited thereby.

The terms used herein are only used to describe specific implementation examples or embodiments and are not intended to limit the present disclosure. Also, a singular expression includes a plural expression unless the context clearly indicates otherwise. In this specification, terms such as "include" or "consist of" are intended to designate that features, numbers, steps, operations, components, parts, or combinations thereof described herein are present. That is, in this specification, the terms such as "include" or "consist of" should not be understood as precluding the possibility of presence or addition of one or more other features, numbers, steps, operations, components, parts, or combinations thereof.

Terms including ordinals such as "first" and "second" may be used to describe various components, but the components are not limited by the terms. The terms are only used for the purpose of distinguishing one component from another component.

When a certain component is mentioned as being "connected" or "linked" to another component, although the certain component may be directly connected or linked to the other component, it should be understood that another component may be present therebetween. On the other hand, when a certain component is mentioned as being "directly connected" or "directly linked" to another component, it should be understood that other components are not present therebetween.

When a certain component is mentioned as being "on" or "under" another component, it should be understood that the certain component may be disposed directly on the other component or another component may be present therebetween.

Unless otherwise defined, all terms including technical or scientific terms used herein have the same meaning as commonly understood by one of ordinary skill in the art to which the present disclosure pertains. Terms, such as those defined in commonly used dictionaries, should be construed as having a meaning that is consistent with their meaning in the context of the relevant art and are not to be construed in an idealized or overly formal sense unless expressly so defined herein.

A direction in which a door is installed based on the center of an appliance in a state in which the appliance is placed on a floor is defined as forward. Therefore, a direction approaching the inside of the appliance in a state in which the door is open is rearward. For convenience, a forward-rearward direction may be referred to as a first direction. Then, forward may be referred to as one direction of the first direction, and rearward may be referred to as the other direction of the first direction. Also, the direction of gravity may be defined as downward, and the direction opposite to the direction of gravity may be defined as upward.

Also, a horizontal direction orthogonal to the front-rear direction of the appliance, that is, a width direction of the appliance when the appliance is viewed from in front of the door of the appliance, may be referred to as a left-right direction. For convenience, the left-right direction may be referred to as a second direction. Then, rightward may be referred to as one direction of the second direction, and leftward may be referred to as the other direction of the second direction.

Also, the width direction of the appliance may also be referred to as a lateral direction. Then, rightward may be referred to as one direction of the lateral direction, and leftward may be referred to as the other direction of the lateral direction. Also, the above-described up-down direction may be referred to as a third direction. Then, upward may be referred to as one direction of the third direction, and downward may be referred to as the other direction of the third direction.

Also, the above-described up-down direction may be referred to as a vertical direction. Then, both the front-rear direction and the left-right direction, that is, the first direction and the second direction, may be referred to as a horizontal direction. Throughout the specification, "A and/or B" may refer to A, B, or A and B unless particularly described otherwise, and "C to D" may refer to C or more and D or less unless particularly described otherwise.

[Overall Structure of Appliance]

Figure 2:
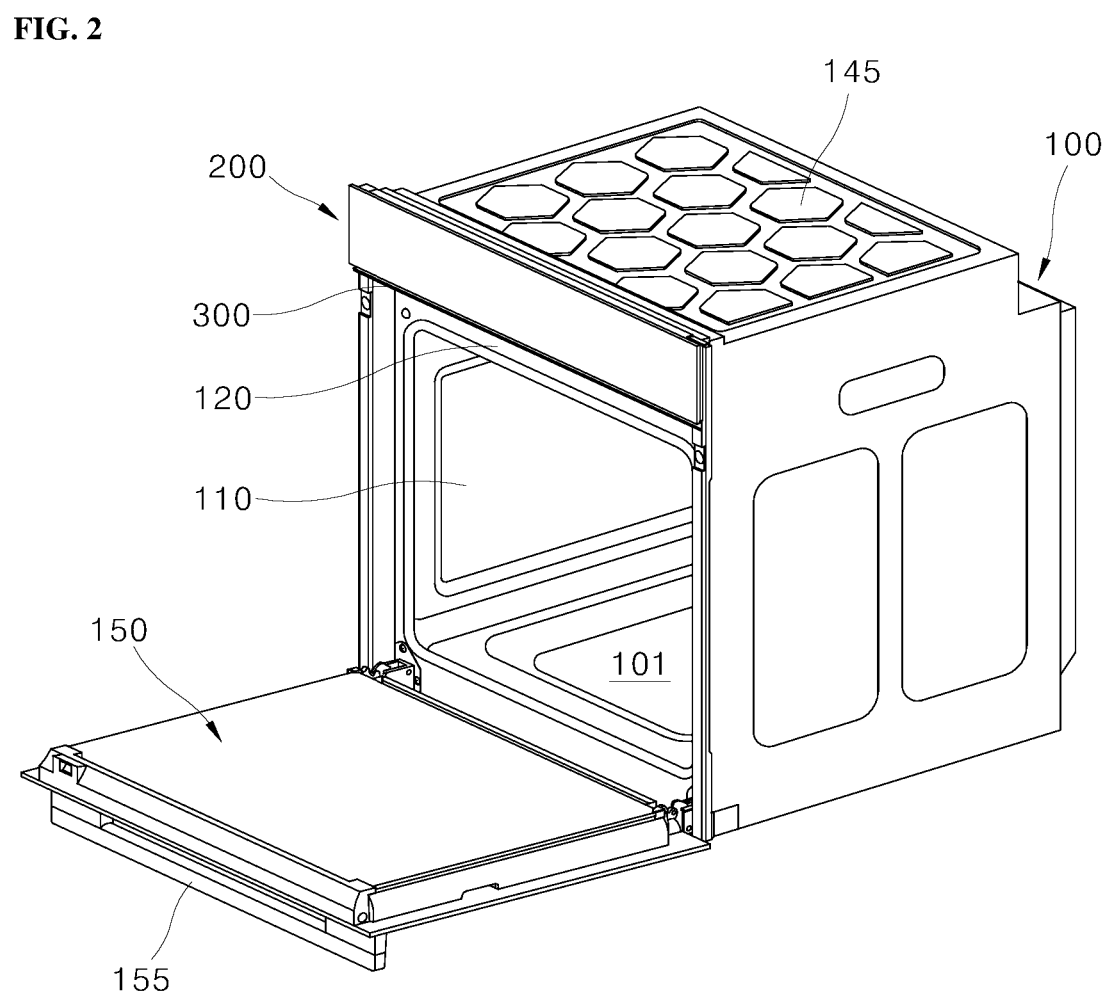
Figure 3:
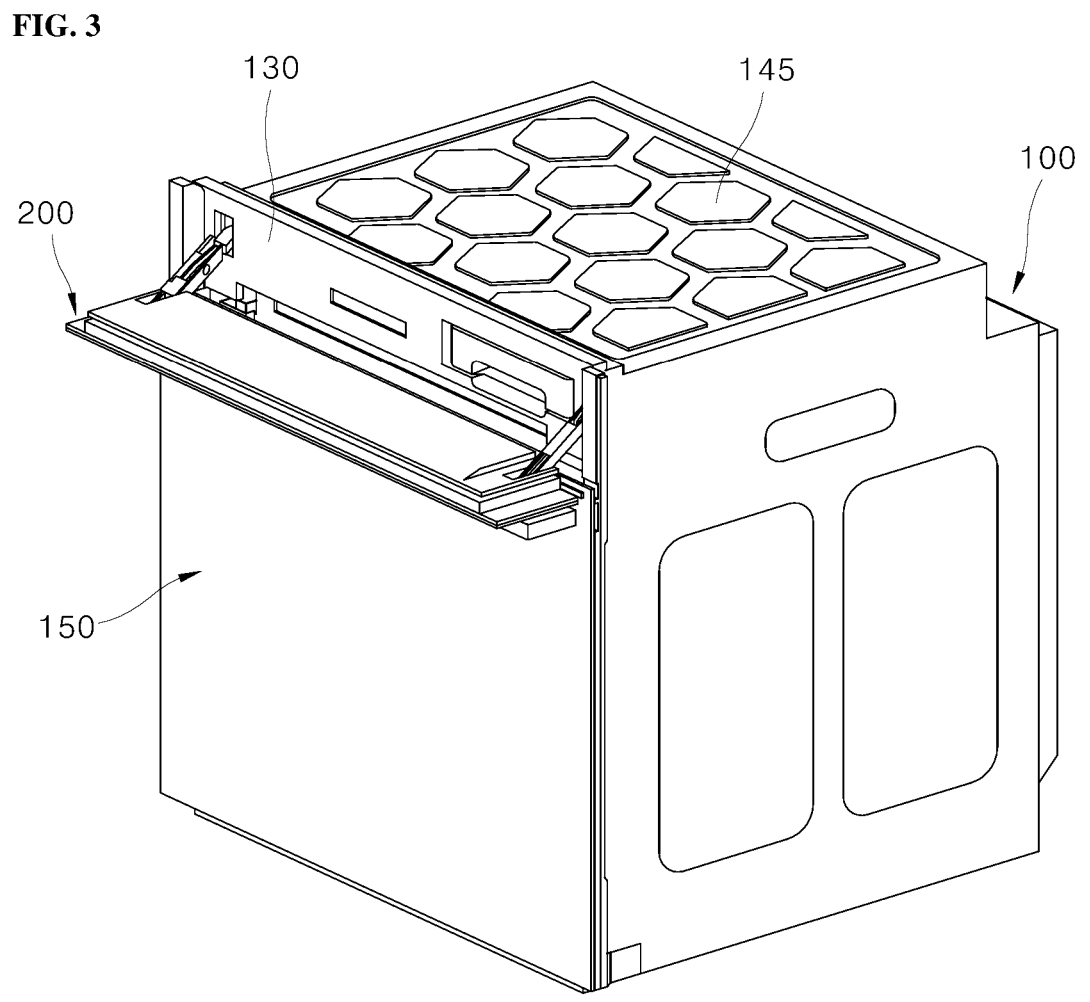
FIG. 3 is a perspective view showing an open state of a control panel of the appliance illustrated in FIG. 1.
Figure 4:
FIG. 4 is a plan view showing an internal structure of a second accommodation space of the appliance illustrated in FIG. 1.
Figure 5:
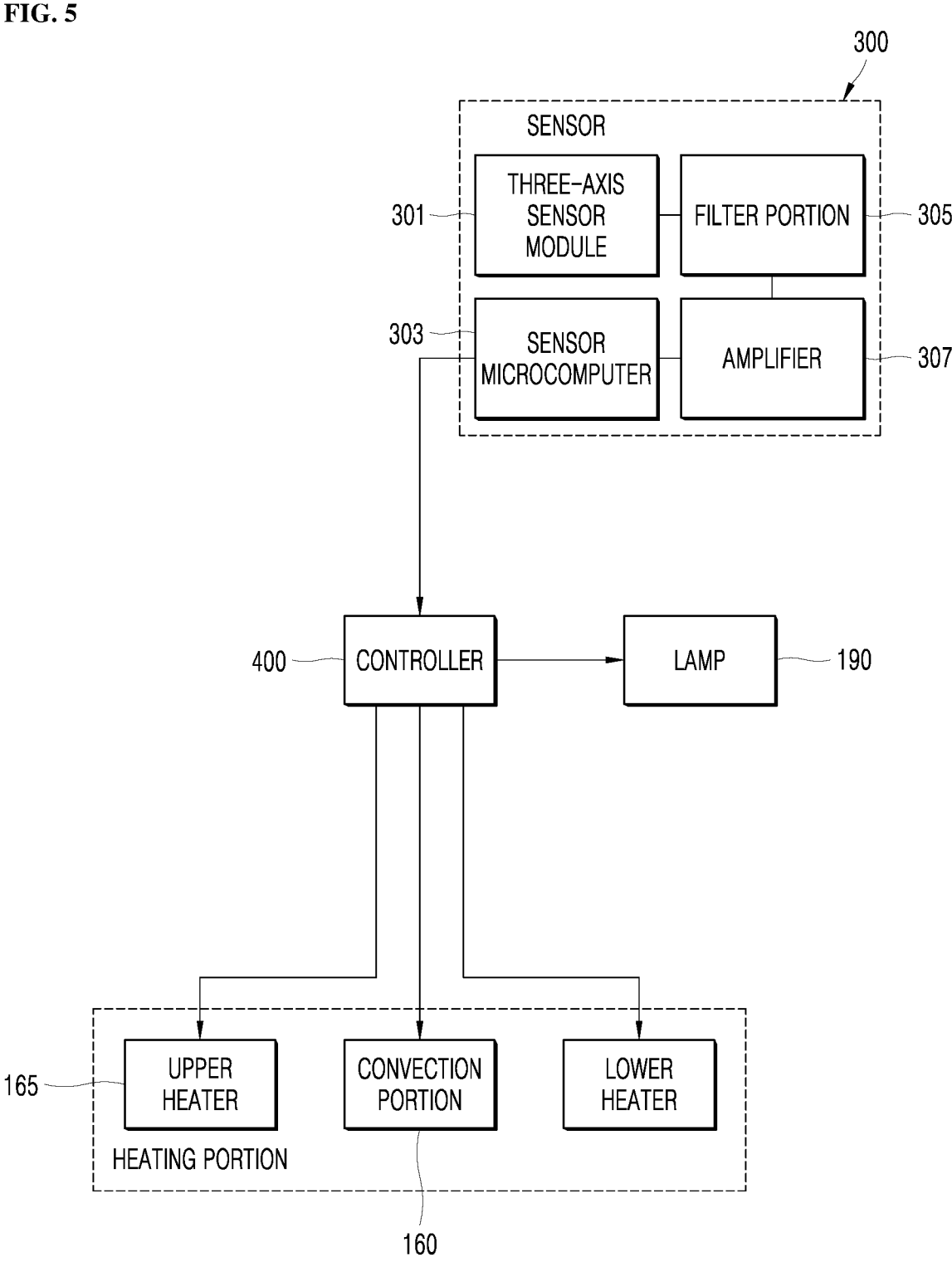
FIG. 5 is a block diagram schematically showing a configuration of the appliance according to one embodiment of the present disclosure.

FIG. 1 is a perspective view illustrating an appliance according to one embodiment of the present disclosure, which is exemplified in this disclosure as a cooking appliance without being limited thereto. FIG. 2 is a perspective view showing an open state of a cooking chamber of the appliance illustrated in FIG. 1, and FIG. 3 is a perspective view showing an open state of a control panel of the appliance illustrated in FIG. 1. Also, FIG. 4 is a plan view showing an internal structure of a second accommodation space of the appliance illustrated in FIG. 1, and FIG. 5 is a block diagram schematically showing a configuration of the appliance according to one embodiment of the present disclosure.

Referring to FIGS. 1 to 3, an exterior of the appliance according to one embodiment of the present disclosure is formed by a main body 100. The main body 100 may be provided in a form that includes a substantially rectangular parallelepiped shape. The main body 100 may be formed of a material having a predetermined strength in order to protect a plurality of components installed in an inner space thereof.

The main body 100 may include a cavity 110. The cavity 110 may form the frame of the main body 110.

Also, the main body 100 may further include front panels 120 and 130. A first front panel 120 may be provided as one of the front panels 120 and 130.

The first front panel 120 may be disposed between the cavity 110 and a door 150. The first front panel 120 may be disposed at a front side of the cavity 110 and form a front surface of the main body 100.

As another example, the first front panel 120 may not be separately provided from the cavity 110, and a front surface of the cavity 110 may form the front surface of the main body 100.

For example, the cavity 110 and the first front panel 120 may be integrally formed with each other and provided in the main body 100.

A first accommodation space 101 may be formed inside the cavity 110. Also, an opening 126 configured to open the first accommodation space 101 forward may be formed inside the first front panel 120.

The first accommodation space 101 may be formed in a hexahedral shape with an open front surface. In a state in which the first accommodation space 101 is closed, the appliance may heat an inner space of the first accommodation space 101 to cook food.

That is, in the appliance, the inner space of the first accommodation space 101 may be a cooking chamber which is a space where food is actually cooked. Hereinafter, the case in which the appliance is a cooking appliance will be described as an example of the present disclosure.

A heating portion configured to heat the first accommodation space 101 may be provided in the appliance. As an example of the heating portion, as illustrated in FIGS. 2 and 5, a convection portion 160 configured to cause convection of hot air to heat the inner space of the first accommodation space 101 may be provided as the heating portion at a rear side of the first accommodation space 101.

Also, an upper heater 165 or an upper burner configured to heat the inner space of the first accommodation space 101 from an upper side may be provided as the heating portion at an upper side of the first accommodation space 101. Also, a lower heater or a lower burner configured to heat the inner space of the first accommodation space 101 from a lower side may also be provided as the heating portion at a lower side of the first accommodation space 101.

As illustrated in FIGS. 1 and 2, the door 150 configured to selectively open or close the first accommodation space 101 may be rotatably provided at a front side of the main body 100. The door 150 may open or close the first accommodation space 101 by being operated in a pull-down manner in which an upper end of the door 150 vertically rotates about a lower end thereof.

The door 150 may be formed in a hexahedral shape having a predetermined thickness as a whole. Also, a handle 155 provided to be gripped by a user when the user wants to rotate the door 150 may be installed at a front surface of the door 150.

Also, a see-through window may be provided at the door 150. The see-through window may be implemented using a transparent material such as glass or transparent plastic. According to an appliance to which the see-through window is applied, it may be necessary to form the see-through window to withstand high temperature and high pressure, and it may also be necessary to add functions such as waterproofing and heat-proofing to the see-through window.

As illustrated in FIGS. 2 to 4, a second accommodation space 103 may be provided at a portion outside the cavity 110, more specifically, at an upper side of the cavity 110. The second accommodation space 103 may be disposed at an upper side of the cavity 110 and the first accommodation space 101 formed therein.

A space for installing electric components may be formed inside the second accommodation space 103. That is, in the appliance, the second accommodation space 103 may be an electric component chamber which is a space for installing electric components.

A front surface of the second accommodation space 103 may be covered by the front panels 120 and 130. A second front panel 130 may be provided as one of the front panels 120 and 130.

The second front panel 130 may block a front side of the second accommodation space 103 and may be disposed between the second accommodation space 103 and a control panel 200.

As an example, the second front panel 130 may be disposed at an upper side of the first front panel 120 and may be coupled to the first front panel 120.

The second front panel 130 may protrude to a portion above the cavity 110 and define a front boundary surface of the second accommodation space 103. More specifically, most of the front side of the second accommodation space 103 is blocked by the second front panel 130. Also, a portion of the front side of the second accommodation space 103, that is, a portion of a lower side of the second accommodation space 103, may be blocked by the first front panel 120.

Meanwhile, an exhaust port 122 may be provided in the front panels 120 and 130. In the present embodiment, the exhaust port 122 is provided in the first front panel 120.

The exhaust port 122 may be formed to pass through the first front panel 120 in the front-rear direction. The exhaust port 122 may form a passage in the front panels 120 and 130 to allow air inside the second accommodation space 103 to pass through the first front panel 120 and be discharged to the outside of the second accommodation space 103.

The exhaust port 122 may be disposed at a position biased toward one side end of the first front panel 120 in the left-right direction from the center of the first front panel 120 in the left-right direction. For example, the exhaust port 122 may be disposed between the center of the first front panel 120 in the left-right direction and a right side of the first front panel 120.

As another example, the front panels 120 and 130 may not be separately provided from the cavity 110, and the front surface of the cavity 110 may form the front surface of the main body 100. In this case, the exhaust port 122 may be provided in the front surface of the cavity 110 that is formed in a shape corresponding to the shapes of the front panels 120 and 130.

The control panel 200 may be provided at an upper portion of the front surface of the appliance, that is, at a front surface of the portion above the cavity 110. The control panel 200 may form a portion of the front exterior of the appliance.

The control panel 200 may be disposed at the front side of the second accommodation space 103. Also, the control panel 200 may be disposed at a front side of the second front panel 130.

As illustrated in FIGS. 3 and 4, the control panel 200 may be provided to open and close the second accommodation space 103 or the second front panel 130. The control panel 200 is provided to rotate between a closing position at which the control panel 200 blocks the second accommodation space 103 or the second front panel 130 and an opening position at which the control panel 200 opens the second accommodation space 103 or the second front panel 130 forward.

A display may be provided on the control panel 200. The display may include an input portion allowing an operation of the appliance to be controlled and a display configured to display an operational state of the appliance.

As an example, the input portion and the display may be configured by a single panel. For example, the input portion and the display may be formed as a touch panel that receives a touch input of a user. The display may display a user interface (UI) or a graphic user interface (GUI) relating to the operation of the appliance.

A plurality of buttons may be displayed on the control panel 200 having the display. For example, a knock-on button for setting a function that allows a lamp 190 installed in the first accommodation space 101 to be turned on or off by a knock input of a user may be displayed on the control panel 200.

Also, a lamp button for setting a function for manually turning the lamp on or off, a button for setting the operation of opening or closing the control panel 200, and the like may be displayed on the control panel 200.

Also, when the appliance is an oven, a button for setting an operation of the heating portion, a self-cleaning button for setting a self-cleaning function of the first accommodation space 101, and the like may be displayed on the control panel 200.

As another example, the control panel may be provided in the form of a simple panel that does not include the input portion, the display, or the like. Even the control panel in this form may be disposed at the front side of the second accommodation space 103 to cover the second accommodation space 103, may rotate downward to move to the opening position, and may be unfolded forward at the opening position, like the control panel 200 described above.

As still another example, the control panel may be provided so that only a portion of the control panel can be opened. For example, a structure in which the control panel is divided into a plurality of areas in the lateral direction may be applied. In this case, among the plurality of areas of the control panel, only an area that covers a water tank 320 from a front side may rotate downward and be unfolded forward, and the remaining areas may be fixed and not be opened.

As yet another example, a structure in which the control panel is divided into a plurality of areas in the up-down direction, and among the plurality of areas, only an upper area that covers the water tank 320 from the front side rotates downward and is unfolded forward may be applied.

Meanwhile, a controller 400 may control an operation of the appliance. For example, the controller 400 may control an operation of the heating portion, the lamp 190, or the like based on a manipulation signal input through the display, the input portion, or the like of the control panel 200.

Also, the controller 400 may also control an operation of a display 22 configured to display an operational state of the appliance. As an example, the controller 400 may be configured by a microcontroller mounted on a circuit board.

[Structure Inside Second Accommodation Space]

FIG. 4 is a plan view showing an internal structure of the second accommodation space of the appliance illustrated in FIG. 1.

Referring to FIGS. 2 to 4, a lower boundary surface of the second accommodation space 103 may be defined by an upper panel 140 disposed at an upper side of the cavity 110. Also, an upper boundary surface of the second accommodation space 103 may be defined by an electric component chamber cover 145 configured to cover the second accommodation space 103 from above.

Also, side boundary surfaces and a rear boundary surface of the second accommodation space 103 may be defined by both side surfaces and a back surface of the electric component chamber cover 145 or may be defined by both side surfaces of the cavity 110 that protrude to an upper side of the first accommodation space 101 and a back surface of the electric component chamber cover 145.

An air hole 104 may be formed in at least any one of both side surfaces and the back surface of the electric component chamber cover 145 and both side surfaces of the cavity 110. Through the air hole 104, outside air may be introduced into the second accommodation space 103.

Various electric components may be disposed inside the second accommodation space 103 as described above. As an example thereof, a circuit board may be disposed inside the second accommodation space 103. Various devices, circuits, and the like relating to reception of manipulation signals input through the control panel 200, generation of control signals for controlling the operation of the heating portion, and the like may be provided on the circuit board.

The upper panel 140 may include a blocking plate portion 141 and a duct portion 143.

The blocking plate portion 141 may be disposed to block between the cavity 110 and the second accommodation space 103. The blocking plate portion 141 may be disposed at an upper side of the cavity 110 to define the lower boundary surface of the second accommodation space 103.

The duct portion 143 may be formed to protrude upward from the blocking plate portion 141. The duct portion 143 may form a passage that allows air inside the second accommodation space 103 to be discharged to the outside of the second accommodation space 103 through the inside of the duct portion 143. That is, the duct portion 143 may form a passage that allows air suctioned by a fan module 170, which will be described below, to flow toward the exhaust port 122.

The fan module 170 may be disposed inside the second accommodation space 103. The fan module 170 may be disposed at a position biased toward a side adjacent to a rear surface of the cavity 110, that is, a rear side inside the second accommodation space 103.

The fan module 170 may be formed to include a turbofan installed inside the second accommodation space 103. The fan module 170 may suction outside air through the rear side of the second accommodation space 103 and discharge the suctioned air forward.

By the operation of the fan module 170, outside air may be introduced into the second accommodation space 103 from the rear side and both lateral sides of the appliance.

For example, outside air introduced through a lower portion of the main body 100 may be introduced into the second accommodation space 103 through the air hole 104 formed in the rear side of the second accommodation space 103 after passing through a rear-side space of the appliance. Also, outside air may also be introduced into the second accommodation space 103 through the air hole 104 formed in any one lateral side of the second accommodation space 103.

The air introduced into the second accommodation space 103 in this way may move forward inside the second accommodation space 103 and cool the electric components inside the second accommodation space 103.

The air introduced into the second accommodation space 103 as described above may be suctioned into the duct portion 143 by the fan module 170. The air introduced into the duct portion 143 may be discharged to the front of the second accommodation space 103 through the exhaust port 122 after moving forward inside the duct portion 143.

As illustrated in FIG. 5, a water supply device 300 may be disposed inside the second accommodation space 103. The water supply device 300 may supply water necessary to generate steam in a steam supply device (not illustrated) to the steam supply device.

As an example, the water supply device 300 may include a housing 310 fixed to the inside of the second accommodation space 103 and the water tank 320 movably accommodated in the housing 310.

The water tank 320 may be withdrawn to the front of the appliance from the inside of the second accommodation space 103 by passing through the front panels 120 and 130. More specifically, the water tank 320 may be withdrawn to the front of the appliance from the inside of the second accommodation space 103 by passing through the second front panel 130.

The steam supply device may heat water supplied by the water supply device 300 to generate steam, and the steam generated by the steam supply device may be supplied to the inside of the first accommodation space 101 through a steam nozzle.

Further, the appliance may further include an opening module 400. The opening module 400 may be disposed in the second accommodation space 103. The opening module 400 is provided to push the control panel 200 disposed at the closing position forward to move the control panel 200 toward the opening position.

As an example, the opening module 400 may use a cam, which is provided to be rotatable, to push and move the control panel 200 forward.

As another example, the opening module 400 may use a pushing bar, which is provided to be stretchable, to push and move the control panel 200 forward.

Meanwhile, a sensor 300 may be disposed in the second accommodation space 103. The sensor 300 may be provided to detect movement of the door 150.

[Structures of Door and Front Panels]

Figure 6:
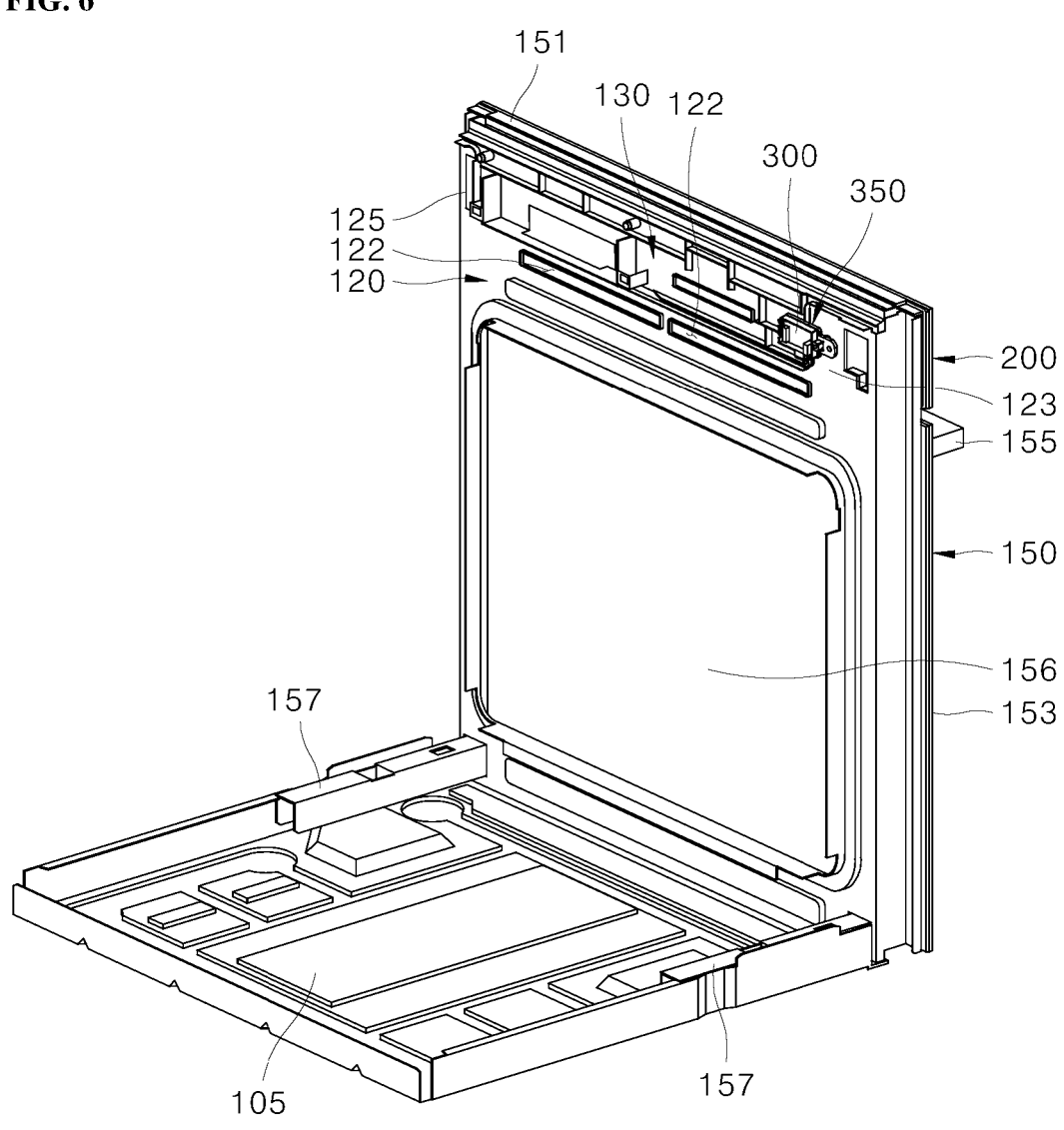
FIG. 6 is a back perspective view separately illustrating a door, the control panel, front panels, a hinge, and a sensor of the appliance according to one embodiment of the present disclosure.
Figure 7:
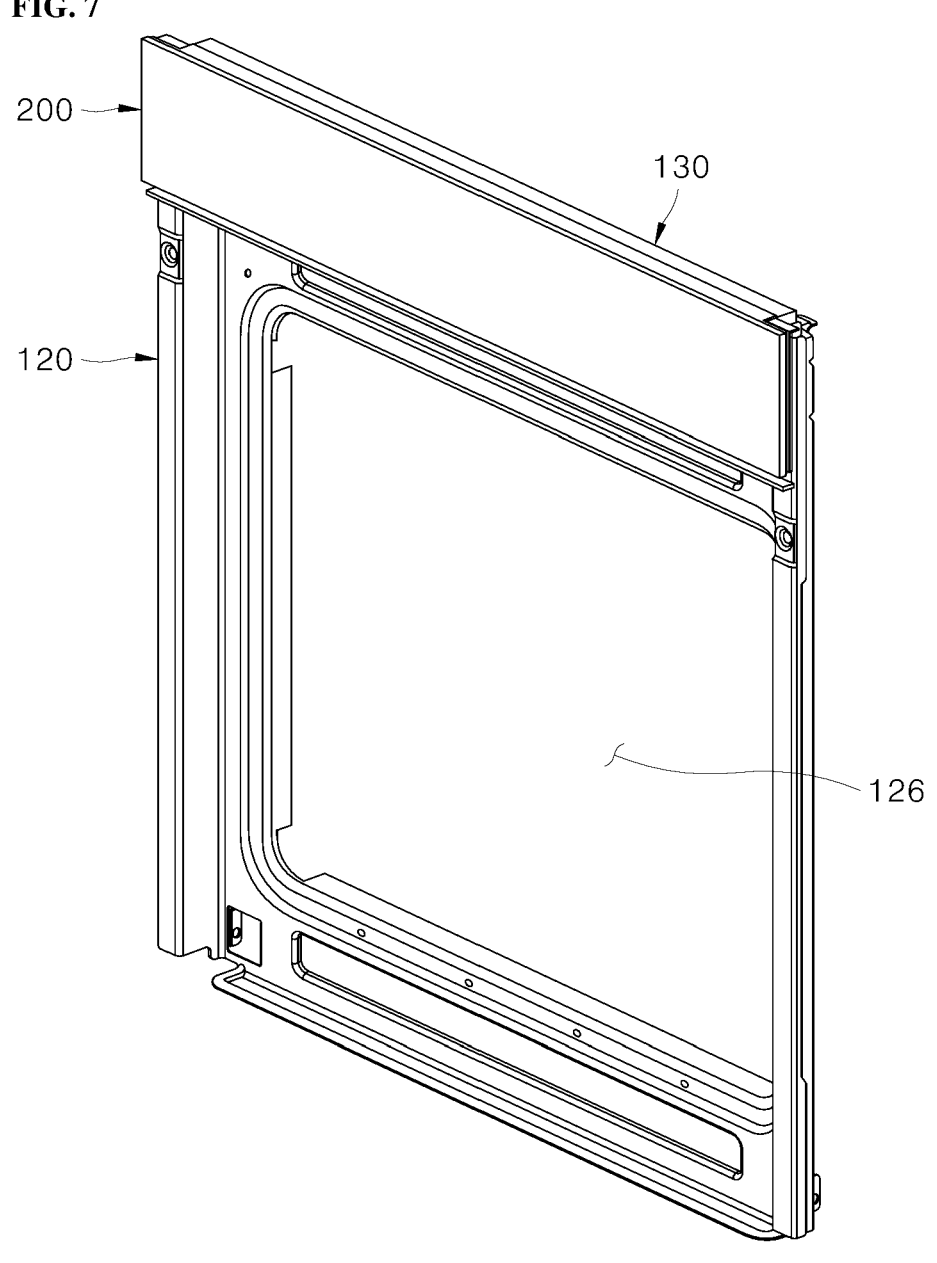
FIG. 7 is a front perspective view separately illustrating the control panel and the front panels illustrated in FIG. 6.
Figure 8:
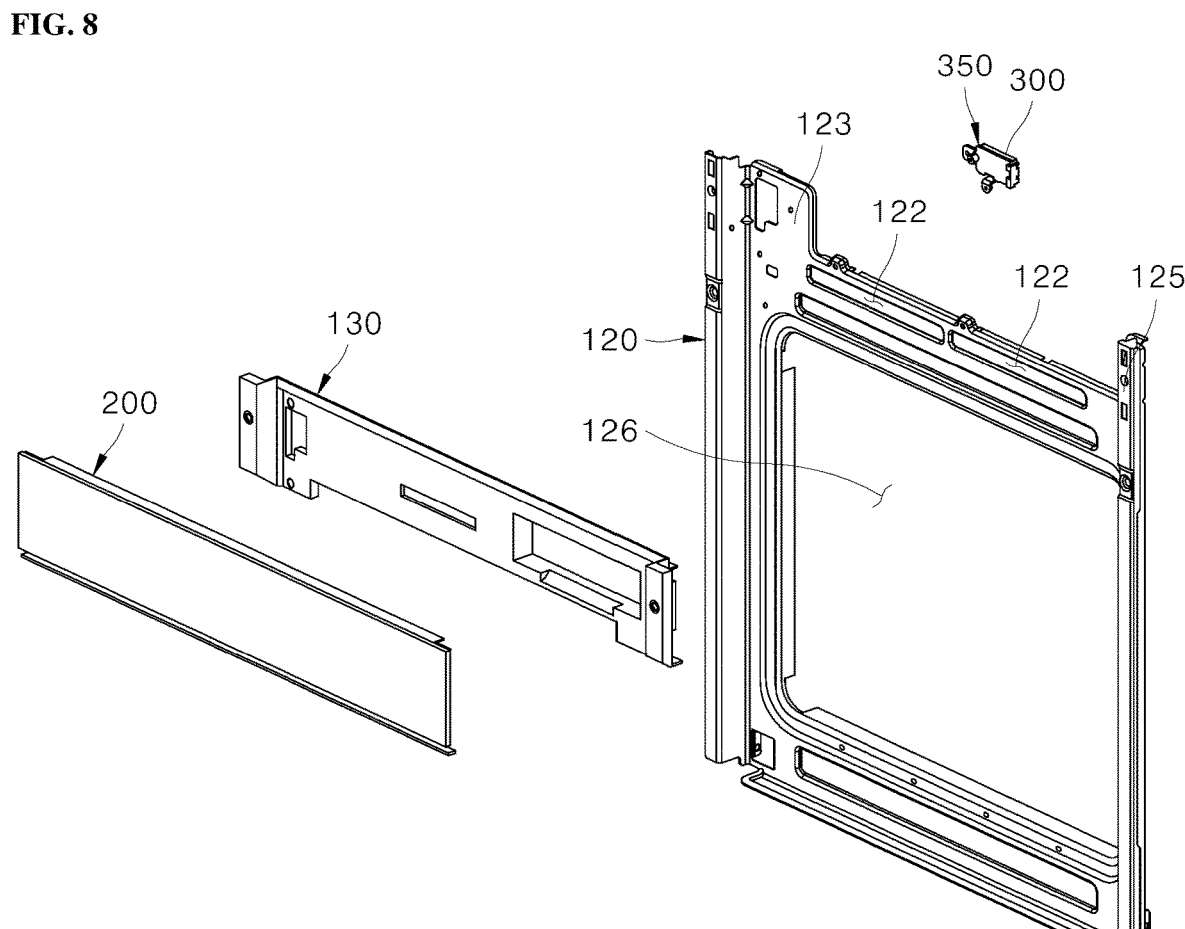
FIG. 8 is a front exploded perspective view illustrating an exploded state of the control panel, the front panels, and the sensor illustrated in FIG. 7.
Figure 9:
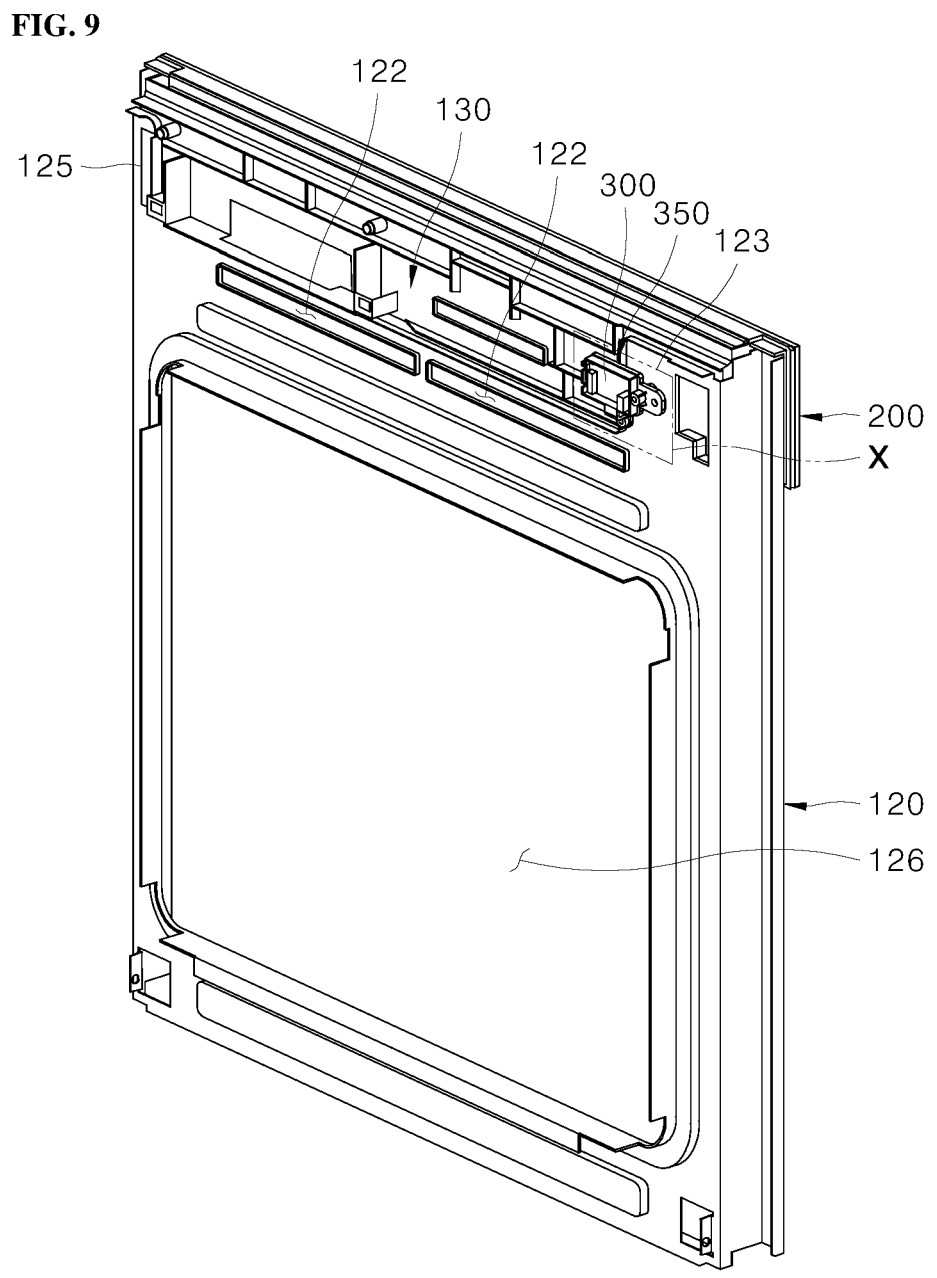
FIG. 9 is a back perspective view separately illustrating the control panel and the front panels illustrated in FIG. 6.

FIG. 6 is a back perspective view separately illustrating a door, the control panel, front panels, a hinge, and a sensor of the appliance according to one embodiment of the present disclosure, and FIG. 7 is a front perspective view separately illustrating the control panel and the front panels illustrated in FIG. 6. Also, FIG. 8 is a front exploded perspective view illustrating an exploded state of the control panel, the front panels, and the sensor illustrated in FIG. 7, and FIG. 9 is a back perspective view separately illustrating the control panel and the front panels illustrated in FIG. 6.

Referring to FIGS. 2 and 6, the door 150 may include a door frame 151 and a front glass 153.

The door frame 151 may form the frame of the door 150 and may form an exterior of an upper surface, a bottom surface, and side surfaces of the door 150. The door frame 151 may be formed in a hexahedral shape with an open front surface and an open rear surface.

Hinges 157 configured to rotatably couple the door frame 151 to the main body 100 may be installed at a lower side of the door frame 151. The hinges 157 may be installed at a lower end of the door frame 151 and may be installed at both sides of the door frame 151 in the lateral direction.

A base plate 105 may be disposed at a lower side of the cavity 110. The base plate 105 may form a bottom surface of the main body 100. Each hinge 157 may be coupled to the base plate 105 and supported by the base plate 105.

The front glass 153 may be disposed at a front side of the door frame 151. The front glass 153 may be coupled to the door frame 151 at the front side of the door frame 151 and may form the front exterior of the door 150.

Also, the door 150 may further include a rear glass 156. The rear glass 156 may be coupled to the door frame 151 at a rear side of the door frame 151 and may form the back exterior of the door 150.

Also, the door 150 may further include an inner glass. As an example, a plurality of inner glasses may be disposed to be spaced apart at predetermined intervals in the front-rear direction inside the door 150. The plurality of inner glasses may be disposed between the front glass 153 and the inner glass disposed at the rearmost portion.

By the inner glasses disposed in this way, the inside of the door 150 may be divided into a plurality of spaces arranged in the front-rear direction. The plurality of inner glasses disposed in this way may serve to suppress heat transferred from inside the first accommodation space 101 to the door 150 from being transferred to the front surface of the door 150.

Referring to FIGS. 6 to 9, the first front panel 120 may be disposed between the door 150 and the cavity 110. The first front panel 120 may be formed of a metal material to withstand high-temperature heat while securing structural rigidity.

The second front panel 130 may be disposed at an upper side of the first front panel 120 and may be coupled to the first front panel 120. The first front panel 120 may include protruding surface portions 123 and 125 configured to protrude upward from side ends of the first front panel 120, and the second front panel 130 may be coupled to the protruding surface portions 123 and 125.

The protruding surface portions 123 and 125 may be disposed at both sides of the first front panel 120 in the lateral direction. That is, the pair of protruding surface portions 123 and 125 may be disposed to be spaced apart from each other in the lateral direction with the opening 126 disposed therebetween. Also, the second front panel 130 may be disposed between the pair of protruding surface portions 123 and 125 and coupled to the pair of protruding surface portions 123 and 125.

As an example, the first front panel 120 may be formed in a shape in which upper ends of both sides protrude upward, e.g., formed in the shape of "Ed." The second front panel 130 may be disposed between the protruding upper ends of both sides of the first front panel 120. Both side ends of the second front panel 130 may be coupled to the protruding ends of both sides of the first front panel 120, respectively.

An edge protrusion 127 may be provided on edges of the protruding surface portions 123 and 125. The edge protrusion 127 may be formed to protrude rearward from an edge of each of the protruding surface portions 123 and 125.

The edge protrusion 127 may be formed to protrude further toward the rear than back surfaces of the protruding surface portions 123 and 125. The edge protrusion 127 may serve to increase the rigidity of edge portions of the protruding surface portions 123 and 125 and suppress an occurrence of deformation of the edge portions of the protruding surface portions 123 and 125.

The protruding surface portions 123 and 125 may be distinguished into a first protruding surface portion 123 and a second protruding surface portion 125. The first protruding surface portion 123 protrudes upward from one side end of the first front panel 120, and the second protruding surface portion 125 protrudes upward from the other side end of the first front panel 120.

The length of the first protruding surface portion 123 in the lateral direction and the length of the second protruding surface portion 125 in the lateral direction may be set to be different from each other. In the present embodiment, the length of the first protruding surface portion 123 in the lateral direction is longer than the length of the second protruding surface portion 125 in the lateral direction.

[Sensor and Installation Structure Thereof]

Figure 10:
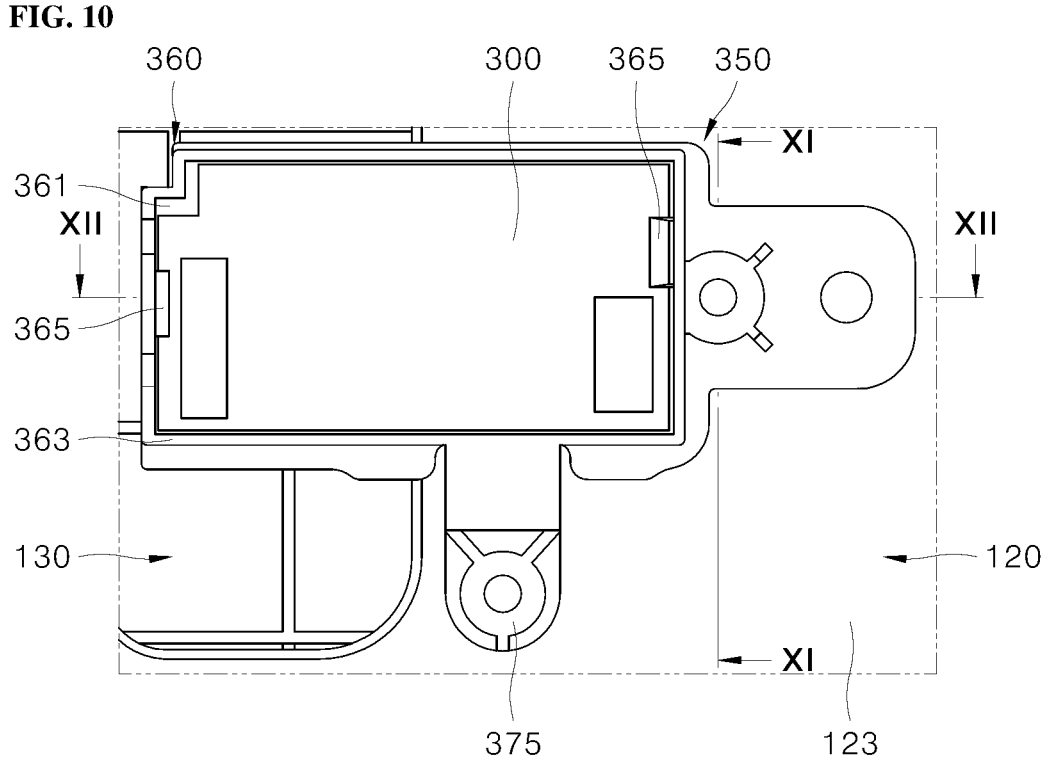
FIG. 10 is an enlarged back view of portion "X" of FIG. 9.
Figure 11:
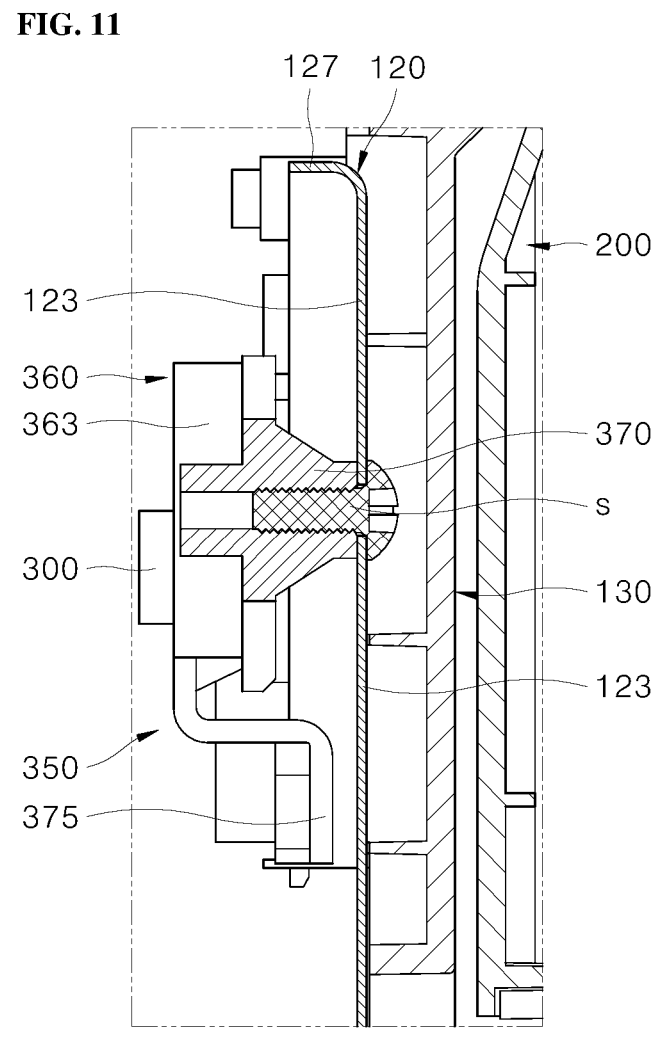
Figure 12:
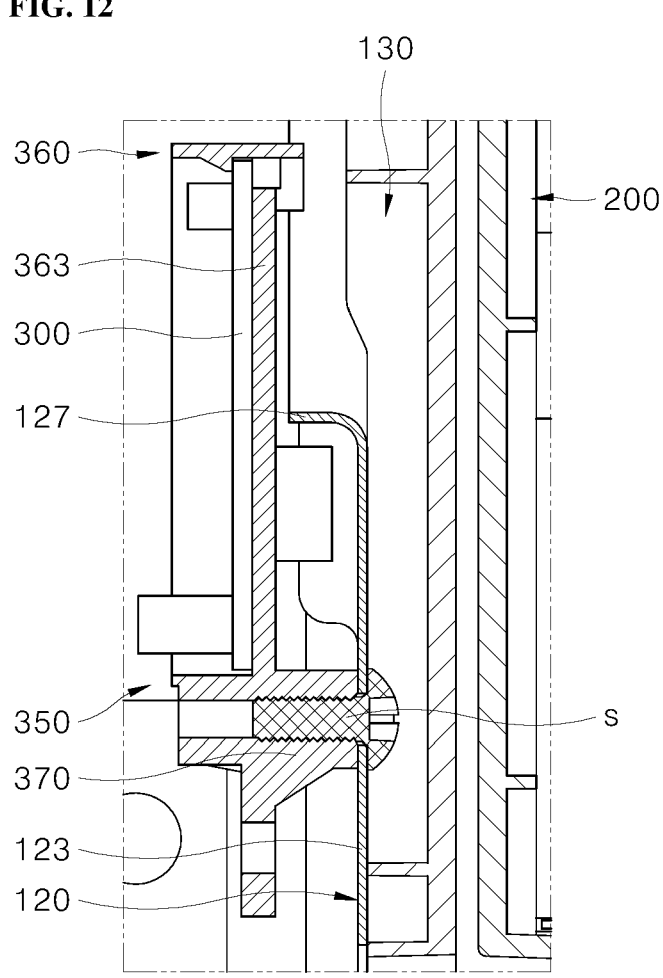
FIG. 12 is a cross-sectional view along line "XII-XII" of FIG. 10.

FIG. 10 is an enlarged back view of portion "X" of FIG. 9, FIG. 11 is a cross-sectional view along line "XI-XI" of FIG. 10, and FIG. 12 is a cross-sectional view along line "XII-XII" of FIG. 10.

Referring to FIG. 9, the appliance of the present embodiment may further include the sensor 300.

As described above, the sensor 300 may be disposed at the rear of the cavity 110 and the second accommodation space 103. The sensor 300 may detect a vibration detection signal that corresponds to a vibration and may, based on the detected vibration detection signal, determine whether a knock has been input. For example, the sensor 300 may determine that a knock has been made when a vibration detection signal of a preset threshold value or more is consecutively detected at certain time intervals.

Also, a vibration caused by a knock may be generated only in one axial direction of the three axial directions. For example, a vibration caused by a knock may be generated only in any one of the x-axis direction, the y-axis direction, and the z-axis direction. Considering this aspect, in order to determine whether a vibration has been caused by a knock, it may be necessary to identify a direction of the vibration that has caused a vibration detection signal to be detected.

As another example, the sensor 300 may compare a pattern of a vibration detection signal caused by a knock and a pattern of an actually-detected vibration detection signal and, based on a result of the comparison, determine whether the vibration has been caused by a knock.

A pattern of a vibration detection signal caused by a knock (hereinafter referred to as "preset knock signal") may be preset. The sensor 300 may compare a pattern of an actually-detected vibration detection signal and a pattern of the preset knock signal and, based on a result of the comparison, determine whether the vibration has been caused by a knock.

The sensor 300 may detect vibrations transmitted in all directions. As an example, the sensor 300 may include a vibration sensor having a plurality of axes. The sensor 300 including the vibration sensor may detect vibrations transmitted in directions along the plurality of axes.

That is, the sensor 300 of the present embodiment may detect a vibration corresponding to a knock by detecting vibrations transmitted in the three axial directions and combining vibration detection signals corresponding to the vibrations in the three axial directions.

As illustrated in FIG. 5, the sensor 300 may include a three-axis sensor module 301 and a sensor microcomputer 303.

As an example, the three-axis sensor module 301 may include a single three-axis acceleration sensor configured to simultaneously detect vibrations transmitted in the three axial directions orthogonal to one another. The three-axis acceleration sensor can detect three-axis components of acceleration using a single sensor. The three-axis acceleration sensor may detect a slight movement change (acceleration) of a medium due to vibration in each of the three axial directions orthogonal to one another.

Here, the three-axis acceleration sensor may be installed so that any one of the three axial directions coincides with a direction of vibration caused by a knock. By the three-axis acceleration sensor being installed in this way, accuracy with which the sensor 300 detects a vibration caused by a knock can be further improved.

As another example, the three-axis sensor module 301 may be provided to include three independent acceleration sensors. As still another example, the three-axis sensor module 301 may be provided to include four or more independent acceleration sensors. The greater the number of acceleration sensors, the higher the accuracy with which the sensor 300 detects a vibration caused by a knock.

Here, at least one of the plurality of acceleration sensors may be installed so that an axial direction in which a vibration is detected by the acceleration sensor coincides with a direction of a vibration caused by a knock. When the direction of a vibration caused by a knock and any one of the three axial directions are aligned in this way, accuracy with which the sensor 300 detects a vibration caused by a knock can be further improved.

As yet another example, a one-axis acceleration sensor configured to detect a vibration in one axial direction and a two-axis acceleration sensor configured to detect vibrations in the other two axial directions may be applied to the sensor 300. In this case, it is necessary to install the sensor 300 so that a direction of vibration caused by a knock made on the door coincides with the axial direction of any one acceleration sensor.

Further, the sensor 300 may further include a filter portion 305. A vibration detection signal detected by the sensor 300 may include unnecessary noise in addition to a vibration detection signal caused by a knock input. The filter portion 305 may serve to remove such noise.

Also, the sensor 300 may further include an amplifier 307. A signal output after the removal of noise therefrom by the filter portion 305 may be amplified by the amplifier 307. Also, the amplified signal may be input to the sensor microcomputer 303.

The sensor microcomputer 303 may be separately configured from the controller 400. The sensor microcomputer 303 may, based on the signal output from the amplifier 307, determine whether a vibration detected by the sensor 300 is a vibration caused by a knock input by a user. When the corresponding vibration is determined as a vibration caused by a knock input by a user, the sensor microcomputer 303 may send information relating thereto to the controller 400.

For example, the sensor microcomputer 303 may, based on a result of comparing a pattern of a vibration detection signal generated by the three-axis sensor module 301 and a pattern of the preset knock signal, determine whether the vibration has been caused by a knock.

The sensor microcomputer 303 may extract a vibration detection signal in a set first direction among vibration detection signals in the three axial directions and may, using the extracted vibration detection signal in the first direction, determine whether the vibration has been caused by a knock. This is because the vibration caused by a knock is generated only in the first direction.

Also, when a vibration detection signal in a first direction is input with a magnitude of a preset first threshold value or more, and then a vibration detection signal is input in the same direction with a magnitude of a preset second threshold value or more within a set time range, the sensor microcomputer 303 may determine that the vibration detected by the sensor 300 is a vibration caused by a knock.

This is because, generally, a knock is made with a "knock-knock" sound, and vibrations corresponding to the "knock-knock" sound are usually shown with signals of a greater magnitude than vibrations generated due to other reasons. Therefore, when vibration detection signals corresponding to the "knock-knock" sound have the magnitude of the first threshold value or more and the magnitude of the second threshold value or more, respectively, the sensor microcomputer 303 may determine that the vibration detected by the sensor 300 is a vibration caused by a knock.

Also, the sensor microcomputer 303 may extract a vibration detection signal in any one axial direction (a first axial direction) that coincides with a direction of a vibration caused by a knock among vibration detection signals in the three axial directions and may, based on a result of comparing the extracted vibration detection signal with vibration detection signals in the other two axial directions (second and third axial directions), determine whether the vibration has been caused by a knock.

For example, when the maximum value of a vibration detection signal in at least one of the second axial direction and the third axial direction is greater than the maximum value of a vibration detection signal in the first axial direction, the sensor microcomputer 303 may determine that the vibration detected by the sensor 300 is not a vibration caused by a knock.

When a signal corresponding to a vibration caused by a knock (hereinafter referred to as "knock-on signal") is received from the sensor 300, more specifically, the sensor microcomputer 303, the controller 400 may turn the lamp 190 on or off according to the signal.

According to the present embodiment, the three-axis sensor module 301 and the sensor microcomputer 303 may be mounted on a single printed circuit board (PCB) and may be, together with the PCB, configured as the sensor 300 in the form of an integrated module. Also, when the sensor 300 additionally includes the filter portion 305 and the amplifier 307, the sensor 300 may be configured in the form of an integrated module in which the three-axis sensor module 301, the sensor microcomputer 303, the filter portion 305, and the amplifier 307 are mounted on a single PCB.

By the sensor 300 being implemented in the form of an integrated module as above, the installation of the sensor 300 may be facilitated, and the installation position of the sensor 300 may be set to various positions.

The sensor 300 may be installed at the main body 100. In the present embodiment, the sensor 300 is installed at the front panels 120 and 130. The sensor 300 may be disposed in the second accommodation space 103 and installed at a rear side of the front panels 120 and 130.

According to the present embodiment, the first front panel 120 may be formed of a metal material, and the sensor 300 may be installed at the first front panel 120.

As described above, the sensor 300 may be disposed in the second accommodation space 103, and for the sensor 300 to be installed at the first front panel 120, the sensor 300 may be installed at the protruding surface portions 123 and 125, which are portions of the first front panel 120 that protrude upward.

As described above, both side ends of the second front panel 130 may be coupled to the protruding surface portions 123 and 125, respectively. The second front panel 130 may be coupled to a front surface of each of the protruding surface portions 123 and 125. The sensor 300 disposed in the second accommodation space 103 may be coupled to back surfaces of the protruding surface portions 123 and 125.

As an example, the sensor 300 may be installed at the first protruding surface portion 123 with a longer length in the lateral direction among the first protruding surface portion 123 and the second protruding surface portion 125. A support surface necessary for installation of the sensor 300 may be secured on the first protruding surface portion 123 formed to have a relatively wider area than the second protruding surface portion 125, and the sensor 300 may be installed at the first protruding surface portion 123.

The appliance of the present embodiment may further include a supporter 350. The supporter 350 may be provided to couple the sensor 300 to the first front panel 120 or to the front panels 120 and 130, e.g. by a fastening means such as a screw.

The supporter 350 may support the sensor 300 while in close contact with the sensor 300. The supporter 350 may cause at least a portion of the sensor 300 to be spaced a predetermined distance apart from the front panels 120 and 130 and couple the portion of the sensor 300 to the first front panel 120 or to the front panels 120 and 130.

As an example, the supporter 350 may include a supporter main body 360. The supporter main body 360 corresponds to an area of the supporter 350 that supports the sensor 300. The supporter main body 360 may include a sensor support surface 361.

The sensor support surface 361 is a surface configured to support the PCB on which the sensor 300 is mounted. The sensor support surface 361 may be formed as a plane having a shape that corresponds to the shape of a plane of the PCB.

For example, each of the PCB and the sensor support surface 361 may be formed in the shape of a quadrangular plane. The PCB on which the sensor 300 is mounted may come in close contact with the sensor support surface 361 and be coupled to the supporter 350.

The supporter 350 may further include sidewalls 363. The sidewalls 363 may extend in a direction orthogonal to the sensor support surface 361 from an edge of the sensor support surface 361.

Each of the sidewalls 363 may be disposed at one edge of the sensor support surface 361, and the sidewalls 363 provided in this way may surround the sensor support surface 361 from outer sides thereof, for example, outer sides thereof in the up-down direction and the left-right direction. The PCB on which the sensor 300 is mounted may be accommodated in a space surrounded by the sensor support surface 361 and the sidewalls 363 and may be coupled to the supporter main body 360.

For example, the sensor support surface 361 may be formed in the shape of a quadrangular plane, and a composite body of the sensor support surface 361 and the sidewalls 363 may be formed in a hexahedral shape that has a space formed therein and an open front.

The supporter main body 360 may further include a plurality of fitting protrusions 365. Each of the fitting protrusions 365 may be formed to protrude from one sidewall. The PCB may be fitted between the sensor support surface 361 and the fitting protrusions 365 and may be detachably coupled to the supporter main body 360.

The supporter 350 may further include supporter coupling portions 370 and 375. The supporter coupling portions 370 and 375 may be coupled to the first front panel 120 or to the front panels 120 and 130, e.g. by the fastening means such as screws, while causing the supporter main body 360 to be spaced a predetermined distance apart from the front panels 120 and 130. In the present embodiment, the supporter coupling portions 370 and 375 include a first supporter coupling portion 370 and a second supporter coupling portion 375.

The first supporter coupling portion 370 may be disposed at a lateral side of the supporter main body 360, and the second supporter coupling portion 375 may be disposed at a lower side of the supporter main body 360.

That is, the first supporter coupling portion 370 may couple the supporter main body 360 to the first front panel 120 or to the front panels 120 and 130 at one side of the supporter main body 360 in the lateral direction, and the second supporter coupling portion 375 may couple the supporter main body 360 to the first front panel 120 or to the front panels 120 and 130 at a lower side of the supporter main body 360.

Here, the first supporter coupling portion 370 and the second supporter coupling portion 375 may couple the supporter main body 360 to the first protruding surface portion 123 of the first front panel 120.

Each of the first supporter coupling portion 370 and the second supporter coupling portion 375 may be formed to protrude forward from the supporter main body 360. For example, a front end of the first supporter coupling portion 370 and a front end of the second supporter coupling portion 375 may be disposed at positions protruding further toward the front than a front end of the supporter main body 360.

The supporter coupling portions 370 and 375 described above may couple the supporter main body 360 to the first protruding surface portion 123 at the lateral and lower sides of the supporter main body 360 and couple the supporter main body 360 so that the supporter main body 360 is spaced a predetermined distance apart from the first front panel 120.

As an example, each of the first supporter coupling portion 370 and the second supporter coupling portion 375 may be formed to protrude forward from the supporter main body 360 and may be formed to protrude a length greater than or equal to a length corresponding to a protruding length of the edge protrusion 127.

Accordingly, the supporter main body 360 may be coupled to the first front panel 120 while maintaining a distance greater than or equal to at least the protruding length of the edge protrusion 127 from the first front panel 120.

In the present embodiment, at least a portion of the supporter main body 360 is disposed at an outer side of the first front panel 120 in the up-down direction and lateral direction.

For example, about half of the areas of the supporter main body 360 and the sensor 300 in the lateral direction may be disposed in an area that overlaps with the first protruding surface portion 123 in the front-rear direction (hereinafter referred to as "rear area of the first protruding surface portion"), and the remaining areas of the supporter main body 360 and the sensor 300 in the lateral direction may be disposed in an area that does not overlap with the first front panel 120 in the front-rear direction (hereinafter referred to as "outer-side area of the protruding surface portions").

For the supporter main body 360 to be disposed as described above, the supporter main body 360 has to pass through a portion of an area where the edge protrusion 127 is disposed.

In consideration of this aspect, the supporter coupling portions 370 and 375 of the present embodiment may couple the supporter main body 360 to the first front panel 120 so that the supporter main body 360 may maintain the distance greater than or equal to at least the protruding length of the edge protrusion 127 from the first front panel 120.

According to the present embodiment, only a partial area of the supporter main body 360 (hereinafter referred to as "first area of the supporter main body") may be disposed in the rear area of the first protruding surface portion 123, and the supporter coupling portions 370 and 375 may couple the supporter main body 360 to the first front panel 120 only at positions biased toward the partial area of the supporter main body 360.

Also, the remaining area of the supporter main body 360 (hereinafter referred to as "second area of the supporter main body") may be disposed in the outer-side area of the protruding surface portions 123 and 125. The second area of the supporter main body 360 is disposed at a position not overlapping with the first front panel 120 in the front-rear direction, and in the second area of the supporter main body 360, coupling between the supporter coupling portions 370 and 375 and the second front panel 130 is also not performed.

Also, even the first area of the supporter main body 360 may be coupled to be spaced a predetermined distance apart from the first front panel 120 by the supporter coupling portions 370 and 375 and thus may remain spaced apart from the first protruding surface portion 123 in the front-rear direction.

According to the fixing structure of the supporter 350 described above, only a partial area of the supporter 350 may be fixed, and the remaining area of the supporter 350 may not be fixed.

Because the sensor 300 and the supporter 350 are very small and light, even when only a partial area of the supporter 350 is fixed as described above, it may be sufficient to stably fix the supporter 350 and the sensor 300 to the first front panel 120.

Also, by maintaining a state in which only a partial area of the supporter 350 is fixed and the remaining area of the supporter 350 is not fixed as described above, vibration of the supporter 350 is much easier to occur compared to when the entire supporter 350 is fixed.

When the supporter 350 is connected to the first front panel 120 so that vibration of the supporter 350 is easy to occur, transmission of vibration from the first front panel 120 to the supporter 350 can be performed with high efficiency, and accordingly, vibration detection performance of the sensor 300 can also be improved.

[Actions and Effects of Sensor]

Figure 13:
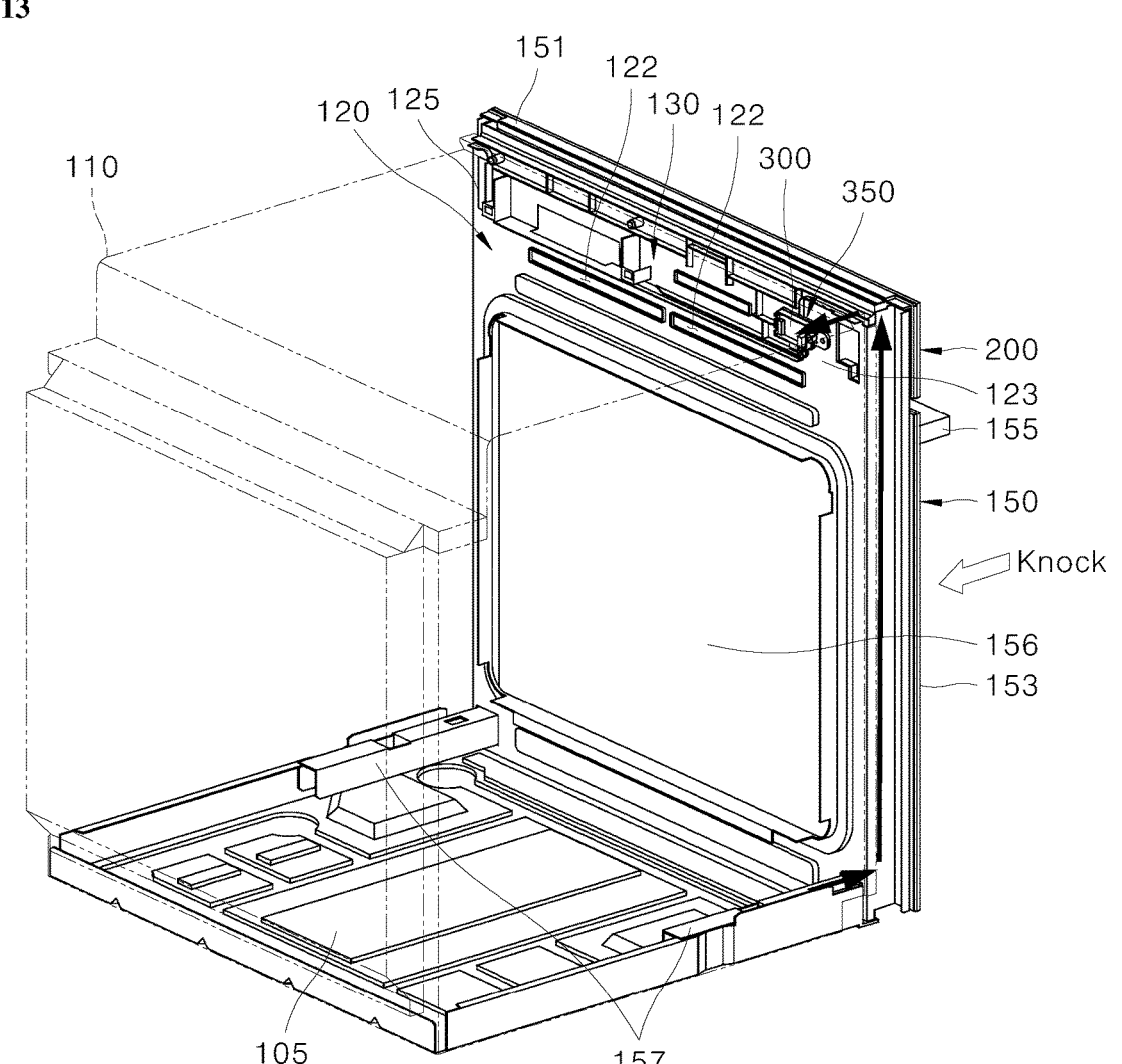
FIG. 13 is a view showing a vibration transmission structure of the appliance according to one embodiment of the present disclosure.

FIG. 13 is a view showing a vibration transmission structure of the appliance according to one embodiment of the present disclosure.

Hereinafter, actions and effects of the appliance according to one embodiment of the present disclosure will be described.

Referring to FIGS. 5 and 13, the sensor 300 may be installed at the main body 100 while supported by the supporter 350. Specifically, the sensor 300 may be installed at the first front panel 120, more specifically, at the protruding surface portions 123 and 125 protruding upward from the lateral sides of the first front panel 120.

When a knock is input to the door 150, a vibration input to the door 150 may be transmitted to the hinge 157 connected to the door 150. Also, the vibration transmitted to the hinge 157 in this way may be transmitted to the main body 100 connected to the hinge 157. The hinge 157 may be connected to the door 150 and the main body 100 so that a vibration generated at the door 150 is able to be transmitted to the main body 100 through the hinge 157.

Specifically, the vibration transmitted to the hinge 157 may be transmitted to the first front panel 120. The vibration transmitted to the first front panel 120 in this way may be transmitted to the sensor 300 connected to the first front panel 120 and detected by the sensor 300.

At least a portion of the hinge 157 and the first front panel 120 that transmit the vibration input to the door 150 as described above may be formed of a metal material. In the present embodiment, the majority of portions of the hinge 157 and the first front panel 120 are formed of a high-strength metal material. The hinge 157 and the first front panel 120 formed in this way may receive the vibration transmitted to the hinge 157 and the first front panel 120 as it is and transmit the received vibration with high efficiency.

The sensor 300 may determine whether the vibration detected by the sensor 300 is a vibration caused by a knock input by a user. When the corresponding vibration is determined as a vibration caused by a knock input by a user, the sensor 300 may output information relating thereto in the form of a first signal and send the first signal to the controller 400.

The controller 400 that has received the first signal from the sensor 300 may control the operation of the lamp 190 based on the first signal.

The above-described operation may be provided by a knock-on function. As an example, the knock-on function may be turned on when a user touches the knock-on button displayed on the input portion of the control panel 200 (see FIG. 1) one time and may be turned off when the user touches the knock-on button one more time.

The knock-on function is a function that allows the lamp 190 to be turned on or off by a knock made by a user. That is, while the knock-on function is turned on, the lamp 190 may be automatically turned on or off due to a knock input by the user. Conversely, while the knock-on function is turned off, the lamp 190 is not automatically turned on or off even when a knock is input by the user.

Therefore, the user may turn on the knock-on function when the user wants to use the knock-on function and may turn off the knock-on function when the user does not want to use the knock-on function.

In the present embodiment, the appliance is an oven that has a cooking chamber of a smaller capacity compared to typical steam ovens or has a cooking chamber of the same capacity but a smaller size overall compared to typical steam ovens (hereinafter referred to as "small and medium-sized steam oven").

In the case of the small and medium-sized steam oven, a distance between a cooking chamber (corresponds to the first accommodation space of the present embodiment) and the control panel is inevitably shortened compared to typical steam ovens. In the small and medium-sized steam oven, instead of a front panel, the control panel serves as a cover that covers an electric component space (corresponds to the second accommodation space of the present embodiment) from a front side.

The control panel 200 of the present embodiment provided to be applied to the above appliance may serve as a cover that covers the second accommodation space 103 from a front side as illustrated in FIGS. 3 to 6.

The front surface of the second accommodation space 103 may be covered by the control panel 200, but when the control panel 200 moves to the opening position, the inside of the second accommodation space 103 is opened toward the front.

In order to prevent this, the second front panel 130 may be provided at the front surface of the second accommodation space 103. The second front panel 130 may serve as a cover that is disposed at a front side of the second accommodation space 103 to cover the second accommodation space 103 from the front side.

Generally, the first front panel 120 may be formed of a metal material to withstand high-temperature heat while securing structural rigidity.

On the other hand, the second front panel 130 may be formed of a synthetic resin material such as plastic. This is because the second front panel 130 does not need to support a heavy object, and temperature is maintained at a very low level around the second accommodation space 103 in which the second front panel 130 is disposed, as compared to around the first accommodation space 101 in which the first front panel 120 is disposed.

Considering this aspect, the front surface of the second accommodation space 103 may be covered by the second front panel 130 formed of a lightweight, low-cost material instead of being covered by a heavy, expensive metallic plate. The second front panel 130 formed of a lightweight, low-cost material as mentioned above can provide effects of lowering the weight and manufacturing costs of the appliance.

Also, the second front panel 130 formed of a synthetic resin material as described above has extremely lower thermal conductivity than the first front panel 120 formed of a metal material. Therefore, the sensor 300 coupled to the second front panel 130 or installed adjacent to the second front panel 130 is much less affected by heat, compared to when the sensor 300 is installed at a member made of a metal material.

The sensor 300 of the present embodiment is disposed at a front portion of the main body 100 that is very adjacent to the door 150. When the sensor 300 is disposed at the front portion of the main body 100 in this way, a distance between the door 150 and the sensor 300 is very close, and because the distance between the door 150 and the sensor 300 is close, the knock detection performance can be improved.

Generally, an increase in the distance between the door 150 and the sensor 300 makes it difficult for a vibration input to the door 150 to be properly transmitted to the sensor 300.

For example, for an acoustic wave caused by a knock to reach the sensor 300, a portion between a point where the knock is made and a point where the sensor 300 is installed may be formed of a single medium, but it is not easy to satisfy this condition.

Considering this aspect, in the present embodiment, the sensor 300 is disposed at the front portion of the main body 100 that is very adjacent to the door 150, thus providing further improved door opening/closing detection performance and knock detection performance.

In the case of an appliance such as an oven, due to the characteristic of the oven that the inside of a cooking chamber closed by the door 150 is heated, high-temperature heat is inevitably transferred to the door 150 and portions around the door 150. Therefore, the front portion of the main body 100 that is very adjacent to the door 150 is prone to be affected by the high-temperature heat.

However, in a rear-side area of the second front panel 130, an influence of heat transferred from around the door 150 can be considerably blocked by the second front panel 130. This is because the second front panel 130 having low thermal conductivity not only does not easily transfer heat to the rear-side area of the second front panel 130, but also serves as a barrier that blocks movement of heat.

Considering this aspect, in the present embodiment, the remaining area of the sensor 300 except for a partial area thereof involved in coupling between the sensor 300 and the first front panel 120 may be disposed in an area overlapping with the second front panel 130 in the front-rear direction.

That is, in the present embodiment, half or more of the area of the sensor 300 may be disposed in a rear area of the second front panel 130 which is an area deviating from a rear area of the first front panel 120.

Accordingly, although the sensor 300 is disposed at the front portion of the main body 100 that is adjacent to an area to which high-temperature heat is transferred, a risk that the sensor 300 may malfunction or be damaged due to an influence of heat can be significantly reduced.

According to the present embodiment, in order to arrange the sensor 300 as described above, the state in which only a partial area of the supporter 350 is fixed and the remaining area of the supporter 350 is not fixed may be maintained.

Accordingly, a wide area of the sensor 300 may be disposed in the rear area of the second front panel 130, and the supporter 350 may be connected to the first front panel 120 so that transmission of vibration from the first front panel 120 to the supporter 350 can be performed with high efficiency.

As a result of installing the supporter 350 as described above to improve the efficiency of transmission of vibration from the first front panel 120 to the supporter 350, it is possible to simultaneously provide an advantageous effect that the vibration detection performance of the sensor 300 is improved and an advantageous effect that a risk of malfunction of or damage to the sensor 300 is reduced due to arranging the sensor 300 at a position less affected by heat.

Also, although the sensor 300 is connected to the first front panel 120 to receive a vibration input to the door 150 through the main body 100, the sensor 300 is disposed to be spaced a predetermined distance apart from the first front panel 120.

That is, the supporter main body 360 configured to support the sensor 300 is coupled to be spaced a predetermined distance apart from the first front panel 120, and accordingly, the sensor 300 may be connected to the first front panel 120 while maintaining a state in which the sensor 300 is spaced a predetermined distance apart from the first front panel 120.

In this way, transfer of heat to the sensor 300 through the first front panel 120 can be more effectively suppressed, and thus knock detection performance of the sensor 300 can be further improved.

Further, the fan module 170 is disposed inside the second accommodation space 103, and the fan module 170 suctions outside air and introduces the outside air into the duct portion 143. Air introduced into the duct portion 143 may be discharged to the front of the second accommodation space 103 through the exhaust port 122 after moving forward inside the duct portion 143.

As compared to other areas of the second accommodation space 103, areas around the duct portion 143 and the exhaust port 122 that are cooled by outside air as described above may maintain a lower temperature state.

The duct portion 143 may be provided so that the width of the duct portion 143, that is, the length of the duct portion 143 in the lateral direction, gradually increases toward a front side. That is, the width of the duct portion 143 may gradually increase toward the front side. Accordingly, in the front portion of the main body 100 where the front panels 120 and 130 are disposed, the duct portion 143 may be disposed in most of the areas at the front side of the main body 100.

According to the present embodiment, the sensor 300 may be disposed at the front portion of the main body 100 and may be disposed at a position adjacent to the duct portion 143 and the exhaust port 122. By the sensor 300 being disposed at a position adjacent to the duct portion 143 and the exhaust port 122 where the temperature is lower than in other areas, a risk that the sensor 300 may malfunction or be damaged due to an influence of heat can be significantly reduced.

In the appliance of the present embodiment described above, the sensor 300 is disposed at the front portion of the main body 100, and the front portion of the main body 100 where the sensor 300 is disposed maintains a low temperature state due to the second front panel 130, the duct portion 143, and the like. In this way, knock detection performance can be improved, and a risk of malfunction of and damage to the sensor 300 can be significantly reduced.

An object of the present disclosure is directed to providing an appliance with an improved structure to allow a sensor to be installed at a position where high knock detection performance can be provided.

An object of the present disclosure is also directed to providing an appliance with an improved structure to allow a knock input to be effectively detected even in an appliance in which it is difficult to attach a sensor on a door due to high-temperature heat, such as an oven.

An object of the present disclosure is directed to providing an appliance with an improved structure to allow a sensor to be installed at a position where high knock detection performance can be provided.

An object of the present disclosure is also directed to providing an appliance with an improved structure to allow a knock input to be effectively detected even in an appliance in which it is difficult to attach a sensor on a door due to high-temperature heat, such as an oven.

In an appliance of an embodiment of the present disclosure, a hinge configured to rotatably support a door is connected to the door and a main body so that a vibration generated at the door can be transmitted to the main body through the hinge, and a sensor installed at the main body detects the vibration transmitted to the main body through the hinge.

Also, in another embodiment of the present disclosure, a sensor may be connected to a first front panel, and a vibration input to a door may be transmitted to the sensor through a hinge and the first front panel that are formed of a metal material.

Also, in another embodiment of the present disclosure, a second front panel formed of a material having low thermal conductivity may be connected to a first front panel formed of a metal material, a sensor may be connected to the first front panel, at least a portion of the sensor may protrude to an outer side of the first front panel, and the portion of the sensor protruding to the outer side of the first front panel may be disposed at a rear area of the second front panel.

According to one aspect of the present disclosure, an appliance includes: a main body having a first accommodation space with an open front surface formed therein; a door disposed at a front side of the first accommodation space and configured to rotate about a lower end of the door, e.g. in a front-rear direction, to open or close the first accommodation space; a hinge installed at the main body and configured to rotatably support the door; and a sensor installed at the main body.

According to a further aspect of the present disclosure, an appliance includes: a cavity having a first (accommodation) space with an open front surface formed therein; a door disposed at a front side of the first (accommodation) space and configured to rotate about a lower end of the door, e.g. in a front-rear direction, to open or close the first (accommodation) space; a first front panel disposed between the cavity and the door; a second (accommodation) space formed at one side of the first (accommodation) space; a sensor disposed in the second (accommodation) space to detect a vibration; and a second front panel disposed at a front side of the second (accommodation) space; wherein the first front panel is connected to the door so that a vibration generated at the door is able to be transmitted to the first front panel, at least a portion of the sensor is disposed at a rear-side area of the second front panel, another portion of the sensor is connected to the first front panel while spaced a predetermined distance apart from the first front panel, and the sensor is connected to the first front panel so that a vibration of the first front panel is able to be transmitted to the sensor.

According to a further aspect of the present disclosure, an appliance includes: a main body including a first space with an open front surface; a door disposed in front of the first space and configured to rotate about a lower end of the door, e.g. in a front-rear direction, to open or close the first space (i.e. the open front surface of the first space); a first front panel disposed in front of the first space (e.g. between the first space and the door) and connected to the door so that a vibration of the door is transmitted to the first front panel; a second space formed at one side of the first space (e.g. at an upper side); a second front panel disposed in front of the second space; and a sensor disposed in the second space to detect a vibration and/or a vibration input (e.g. a knock input); wherein the sensor is coupled to the first front panel while being spaced apart therefrom, so that a vibration of the first front panel is transmitted to the sensor.

The appliances according to any one of these aspects may include one or more of the following features:

The first space and the second space may also be denoted as first accommodation space and second accommodation space, respectively, and vice versa. The first (accommodation) space may be a processing space of the appliance, i.e. a space for placing objects therein to be treated by an operation of the appliance, e.g. a cooking space, a refrigerating space, a laundry treating space, etc. The second (accommodation) space may be an electric component chamber.

The appliance may be a clothes treating apparatus, a cooking appliance, a refrigerator, an oven, etc.

Directional indications may refer to an orientation of the appliance for operation. For instance, a front-rear direction may refer to a direction perpendicular to (a surface of) the door in a closed state of the door. The door may define a front surface of the appliance in a closed state of the door. Front and rear sides may denote opposite sides. Upper and lower sides may be defined with respect to gravity.

The appliance may further include a hinge rotatably supporting the door. The hinge may be connected to the door and to the main body, in particular to the first front panel, so that a vibration generated at the door (e.g. by a vibration input of a user) is able to be transmitted to the main body, in particular to the first front panel, through the hinge.

The sensor may be configured to detect the vibration transmitted to the main body, in particular to the first front panel, through the hinge.

The main body may include: a cavity having the first accommodation space formed therein; and a first front panel or front panels disposed between the cavity and the door and having at least a portion disposed at a front of the second accommodation space.

The first front panel or the front panels may be connected to the hinge so that a vibration transmitted to the hinge is able to be transmitted to the first front panel or the front panels.

The sensor may be installed at the first front panel or the front panels.

The appliance may further include a supporter configured to couple the sensor to the first front panel or the front panels, e.g. by a fastening means such as a screw or bolt. In particular, the appliance may include a supporter connecting or coupling the sensor to the first front panel.

The supporter may support the sensor while in close contact with the sensor. The supporter may be coupled to the first front panel or the front panels while causing at least a portion of the sensor to be spaced a predetermined distance apart from the first front panel or the front panels, i.e. from the first front panel and/or the second front panel.

The supporter may include a supporter main body configured to support the sensor while in close contact with the sensor. The supporter may include further a supporter coupling portion configured to be coupled to the first front panel or the front panels, e.g. by the fastening means, while causing the supporter main body to be spaced a predetermined distance apart from the first front panel or the front panels, i.e. the first front panel and/or the second front panel.

The appliance of the present disclosure may further include a second accommodation space disposed at an upper side of the first (accommodation) space and formed at an outer side of the cavity.

The sensor may be disposed in the second (accommodation) space.

The front panels may include a first front panel disposed between the cavity and the door and a second front panel disposed to block a front of the second (accommodation) space and coupled to the first front panel.

The first front panel may be connected to the hinge so that a vibration transmitted to the hinge is able to be transmitted to the first front panel, and the sensor may be connected to the first front panel.

The hinge and at least a portion of the first front panel may each be formed of a metal material.

The first front panel may include a protruding surface portion configured to protrude upward from a side end of the first front panel. The first front panel may include protruding surface portions configured to protrude upward from side ends of the first front panel.

The sensor may be connected to the protruding surface portion(s).

Both side ends of the second front panel may be coupled to the protruding surface portion(s), and/or the second front panel may be coupled to a front surface of the protruding surface portion(s), and/or the sensor may be coupled to a back surface of the protruding surface portion(s).

At least a portion of the sensor may be disposed in an area that overlaps with the second front panel in a front-rear direction while not overlapping with the first front panel in the front-rear direction. That is, the second front panel may be disposed at a front side of the first front panel. The second front panel may be disposed to overlap the first front panel. The first front panel may have an opening exposing the second front panel, and/or the second front panel may have a portion exposed (or not-overlapped) by the first front panel. The sensor may be disposed at a rear side of the first front panel to have one portion overlapping (and/or facing) the first front panel and another portion directly facing the second front panel, e.g. facing the second front panel through the opening of the first front panel and/or facing the portion of the second front panel being exposed by the first front panel.

Each of or at least one of the cavity, the hinge, and the first front panel may have at least a portion formed of a metal material, and/or the second front panel may be formed of a material having lower thermal conductivity than the first front panel. In particular, at least a portion of the hinge and at least a portion of the first front panel may each be formed of a metal material.

The door, the hinge, and the first front panel may be connected to each other by a metal, i.e. by metal portions. The sensor may be connected to a metal portion of the first front panel that is connected to the hinge. The second front panel may be formed of a material having lower thermal conductivity than the first front panel and/disposed to block a front of the sensor.

At least a portion of the supporter may be disposed in an area that overlaps with the second front panel in the front-rear direction while not overlapping with the first front panel in the front-rear direction.

Coupling between the supporter and the first front panel may be performed only through a partial area or portion of the supporter that is disposed at a position overlapping with the first front panel in the front-rear direction. That is, a portion of the supporter may be coupled to the first front panel that is disposed at a position overlapping with the first front panel in the front-rear direction and/or that is disposed at a position facing the first front panel. In other words, remaining portions of the supporter, except for a portion of the supporter that overlaps with the first front panel in the front-rear direction and/or that faces the first front panel, are spaced apart from the first front panel and/or from the second front panel.

An exhaust port configured to open the second (accommodation) space to a front side may be provided in at least one of the first front panel or the front panels.

The exhaust port may be formed to pass through the first front panel or through the front panels in the front-rear direction.

The appliance may further include a fan module configured to move air inside the second accommodation space toward the exhaust port and/or toward the first front panel or toward the front panels.

The appliance of the present disclosure may further include a blocking plate portion disposed to block between the first (accommodation) space (or the cavity) and the second (accommodation) space. The appliance of the present disclosure may further include a duct portion configured to protrude upward from the blocking plate portion.

The duct portion may form a passage to allow air inside the second (accommodation) space to move toward the exhaust port through the inside of the duct portion. The fan module may be configured to introduce the air inside the second (accommodation) space to the inside of the duct portion.

Advantageous Effects

According to an appliance of the present disclosure, since a sensor is disposed at a front portion of a main body that is adjacent to a door, it is possible to provide door opening/closing detection performance and knock detection performance that are improved corresponding to a decrease in a distance between the door and the sensor.

Also, according to the present disclosure, since at least a portion of a sensor is disposed at a rear-side area of a second front panel formed of a material having low thermal conductivity, and the second front panel serves as a barrier that blocks movement of heat, it is possible to suppress the sensor from being affected by heat transferred from around the door.

Also, according to the present disclosure, since a sensor is disposed in an area that maintains a lower temperature state than other areas of a second accommodation space, such as an area around a duct portion, an exhaust port, and the like cooled by outside air, it is possible to maintain the temperature of the sensor to be low.

According to the present disclosure, there are advantageous effects that a vibration input, e.g. a knock input, can be effectively detected even in an appliance in which it is difficult to attach a sensor on a door due to high-temperature heat, such as an oven, an influence of heat on the sensor can be reduced, and accuracy in detection by the sensor can be improved.

Also, according to the present disclosure, since a sensor is disposed at a position free from an influence of heat, a risk that the sensor may malfunction or be damaged due to the influence of heat can be significantly lowered.

In this way, according to the present disclosure, it is possible to provide advantageous effects that an influence of heat on the sensor can be reduced, and accuracy in detection by the sensor can be improved.

The present disclosure has been described above with reference to the embodiments illustrated in the accompanying drawings, but the above description is merely illustrative, and those of ordinary skill in the art should understand that various modifications and other equivalent embodiments are possible from the above description. Therefore, the true technical scope of the present disclosure should be defined by the claims below.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An appliance comprising:
a main body defining a first accommodation space with an open front and a second accommodation space;
a door hingedly connected to the main body and configured to open and close the first accommodation space;
a first front panel provided between the main body and the door;
a second front panel provided at a front of the second accommodation space;
a sensor provided in the second accommodation space and configured to detect vibration; and
a supporter coupled first front panel and to the sensor such that the sensor is spaced apart from the first front panel,
wherein vibration at the door is transmitted through the first front panel and the supporter to the sensor,
wherein the supporter includes:
a supporter main body configured to contact and support the sensor; and
supporter couplers configured to be coupled to the first and second front panels while spacing the supporter main body apart from the first front panel and the second front panel.

2. The appliance of claim 1, further comprising a hinge configured to rotatably support the door,
wherein:
the hinge is connected to the door and the first front panel so that vibration at the door is transmitted to the first front panel through the hinge, and
the sensor detects vibration transmitted to the first front panel through the hinge.

3. The appliance of claim 2, wherein at least a portion of the sensor is positioned to overlap the second front panel in the front-rear direction without overlapping with the first front panel in the front-rear direction.

4. The appliance of claim 3, wherein:
at least a portion of the hinge and at least a portion of the first front panel are formed of a metal material; and the second front panel is formed of a material having lower thermal conductivity than the first front panel.

5. The appliance of claim 1, wherein:

the appliance comprises an exhaust port configured to open the second accommodation space to a front side and provided in at least one of the first front panel or the second front panel, the exhaust port passes through the at least one of the first front panel or the second front panel in the front-rear direction, and the appliance further comprises a fan module configured to move air inside the second accommodation space toward the exhaust port.

6. The appliance of claim 5, wherein:

the appliance further comprises:

a blocking plate provided between the cavity walls and the second accommodation space, and a duct region provided between upwardly protruding sections of the blocking plate, the duct region forms a passage through which air inside the second accommodation space moves toward the exhaust port, and the fan module introduces the air inside the second accommodation space toward an inside of the duct region.

7. The appliance of claim 1, wherein:

the first front panel includes surface protrusions that extend from side ends of the first front panel; and the sensor is connected to at least one of the surface protrusions.

8. The appliance of claim 1, further comprising a hinge configured to rotatably support the door, wherein at least a portion of the hinge and at least a portion of the first front panel are formed of a metal material.

9. The appliance of claim 8, wherein:

the door, the hinge, and the first front panel are connected to each other by metal;

the sensor is connected to a metal portion of the first front panel that is also connected to the hinge; and the second front panel is formed of a material having lower thermal conductivity than the first front panel and is provided to cover a front of the sensor.

10. An appliance of claim 1, wherein:

vibration at the door is transmitted to the first front panel, a first portion of the sensor is provided at a rear-side of the second front panel in the second accommodation space, and a second portion of the sensor is connected to and spaced apart from the first front panel so that vibration of the first front panel is transmitted to and detected by the sensor.

11. An appliance comprising:

cavity walls defining a first accommodation space with an open front;

a door provided at the front of the first accommodation space and is configured to rotate about a lower end of the door in a front-rear direction to open or close the first accommodation space;

a first front panel provided between the cavity walls and the door;

a second accommodation space formed at one side of the first accommodation space;

a sensor provided in the second accommodation space and configured to detect vibration;

a second front panel provided at a front of the second accommodation space; and a supporter configured to be coupled to the first front panel and to support the sensor, wherein:

vibration at the door is transmitted to the first front panel, a first portion of the sensor is provided at a rear-side of the second front panel in the second accommodation space, and a second portion of the sensor is connected to and spaced apart from the first front panel so that vibration of the first front panel is transmitted to and detected by the sensor, at least a portion of the supporter is positioned to overlap the second front panel in the front-rear direction without overlapping with the first front panel in the front-rear direction, and the supporter and the first front panel are coupled only at a portion of the supporter that is provided at a position overlapping with the first front panel in the front-rear direction.

12. An appliance comprising:

cavity walls defining a first accommodation space with an open front;

a door provided at the front of the first accommodation space and is configured to rotate about a lower end of the door in a front-rear direction to open or close the first accommodation space;

a first front panel provided between the cavity walls and the door;

a second accommodation space formed at one side of the first accommodation space;

a sensor provided in the second accommodation space and configured to detect vibration; and a second front panel provided at a front of the second accommodation space, wherein:

vibration at the door is transmitted to the first front panel, a first portion of the sensor is provided at a rear-side of the second front panel in the second accommodation space, a second portion of the sensor is connected to and spaced apart from the first front panel so that vibration of the first front panel is transmitted to and detected by the sensor, the first front panel includes surface protrusions that extend from side ends of the first front panel, the sensor is connected to at least one of the surface protrusions, and both side ends of the second front panel are coupled to the surface protrusions of the first front panel, respectively;

the second front panel is coupled to front surfaces of the surface protrusions of the first front panel; and the sensor is coupled to back surfaces of the surface protrusions of the first front panel.

13. An appliance comprising:

a main body defining a first accommodation space with an open front and a second accommodation space;

a door hingedly connected to the main body and configured to open and close the first accommodation space;

a first front panel provided between the main body and the door;

a second front panel provided at a front of the second accommodation space, a sensor provided in the second accommodation space and configured to detect vibration; and

a supporter coupled first front panel and to the sensor such that the sensor is spaced apart from the first front panel, wherein vibration at the door is transmitted through the first front panel and the supporter to the sensor, the first front panel includes surface protrusions that extend from side ends of the first front panel, and the supporter is connected to at least one of the surface protrusions.

14. The appliance of claim 13, wherein the supporter includes:

a supporter main body configured to contact and support the sensor; and supporter couplers configured to be coupled to the first and second front panels while spacing the supporter main body apart from the first front panel and the second front panel.

15. The appliance of claim 13, further comprising a hinge configured to rotatably support the door, wherein:

the hinge is connected to the door and the first front panel so that vibration at the door is transmitted to the first front panel through the hinge, and the sensor detects vibration transmitted to the first front panel through the hinge.

16. The appliance of claim 15, wherein the supporter positioned the sensor such that at least a portion of the sensor is positioned to overlap the second front panel in a front-rear direction without overlapping with the first front panel in the front-rear direction.

* * * * *